United States Patent
Zhang et al.

(10) Patent No.: US 10,762,542 B2
(45) Date of Patent: Sep. 1, 2020

(54) ITEM TRANSFER APPARATUS, SYSTEM AND METHOD

(71) Applicant: Tencent Technology (Shenzhen) Company Limited, Shenzhen (CN)

(72) Inventors: Shanwan Zhang, Shenzhen (CN); Huashan Chen, Shenzhen (CN); Bin Chen, Shenzhen (CN); Dongming Qin, Shenzhen (CN); Huanming Wu, Shenzhen (CN); Huiqiu Zhou, Shenzhen (CN); Hongru Xu, Shenzhen (CN); Songjian Wang, Shenzhen (CN); Kexiao Duan, Shenzhen (CN); Jia Yang, Shenzhen (CN); Ningbo Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 671 days.

(21) Appl. No.: 15/212,683

(22) Filed: Jul. 18, 2016

(65) Prior Publication Data

US 2016/0328764 A1 Nov. 10, 2016

Related U.S. Application Data

(63) Continuation of application No. PCT/CN2015/080908, filed on Jun. 5, 2015.

(30) Foreign Application Priority Data

Jun. 6, 2014 (CN) .......................... 2014 1 0250035

(51) Int. Cl.
*G06Q 30/00* (2012.01)
*G06Q 30/06* (2012.01)
(Continued)

(52) U.S. Cl.
CPC ......... *G06Q 30/0601* (2013.01); *G06Q 20/32* (2013.01); *G06Q 20/322* (2013.01);
(Continued)

(58) Field of Classification Search
CPC .......... G06Q 30/0601; G06Q 30/0613; G06Q 20/32; G06Q 20/322; G06Q 20/3226;
(Continued)

(56) References Cited

U.S. PATENT DOCUMENTS 8,843,064 B2 * 9/2014 Hwang ............... H04M 1/7253
455/41.2
8,930,270 B2 * 1/2015 Roskind ................ G06Q 20/02
705/40

(Continued)

FOREIGN PATENT DOCUMENTS

CN 101000675 A 7/2007
CN 101257619 A 9/2008
(Continued)

OTHER PUBLICATIONS

"IdOnDemand Announces Breakthrough in Secure Mobile Device Access Using a Universal Corporate Identity," PR Newswire [New York], Feb. 17, 2011 (Year: 2011).*
(Continued)

*Primary Examiner* — Anne M Georgalas
(74) *Attorney, Agent, or Firm* — Anova Law Group, PLLC

(57) ABSTRACT

The present disclosure discloses an item transfer apparatus, system and method, and belongs to the field of data processing. The method includes: sending, by a terminal, an order instruction of a target item to an order management system, feeding back, by the order management system, order information of an order to the terminal, sending, by the terminal, a resource exchange instruction to a card manage-
(Continued)

ment system according to the order information and a read e-card, completing, by the card management system, transfer of the exchange resource, sending, by the order management system, an item transfer instruction to an item provider device according to a resource transfer result, and completing, by the item provider device, transfer of the target item. The present disclosure solves the problem that the current item transfer method not only needs to bind an e-card to a mobile phone but also has cumbersome operations; thereby achieving an effect that a user can acquire a target item through the e-card after directly making an order at a terminal without pre-binding or scanning a two-dimensional code or other additional operations.

11 Claims, 12 Drawing Sheets

(51) Int. Cl.
    *G06Q 20/32*     (2012.01)
    *G06Q 20/34*     (2012.01)
    *G07F 7/08*     (2006.01)

(52) U.S. Cl.
    CPC ..... *G06Q 20/3226* (2013.01); *G06Q 20/3278* (2013.01); *G06Q 20/34* (2013.01); *G06Q 20/352* (2013.01); *G06Q 30/0613* (2013.01); *G07F 7/0893* (2013.01)

(58) Field of Classification Search
    CPC .. G06Q 20/3278; G06Q 20/34; G06Q 20/352; G07F 7/0893
    See application file for complete search history.

(56) References Cited

U.S. PATENT DOCUMENTS

| | | | |
|---|---|---|---|
| 9,092,776 B2* | 7/2015 | Dessert | G06Q 20/40 |
| 9,898,728 B2* | 2/2018 | Brudnicki | G06Q 20/3278 |
| 9,934,500 B2* | 4/2018 | Guyot | G06Q 20/20 |
| 10,032,151 B2* | 7/2018 | Lau | G06Q 20/3224 |
| 10,438,176 B2* | 10/2019 | Johnson | G06Q 20/382 |
| 10,453,050 B1* | 10/2019 | Arumugam | G06Q 20/227 |
| 2002/0007295 A1* | 1/2002 | Kenny | G06O 30/02 |
| | | | 705/307 |
| 2007/0125838 A1* | 6/2007 | Law | G06Q 20/32 |
| | | | 235/379 |
| 2008/0223918 A1* | 9/2008 | Williams | G06Q 20/342 |
| | | | 235/379 |
| 2009/0057396 A1* | 3/2009 | Barbour | G06Q 20/405 |
| | | | 235/379 |
| 2009/0164327 A1* | 6/2009 | Bishop | G06Q 20/02 |
| | | | 705/19 |
| 2010/0057612 A1* | 3/2010 | Wagenhals | G06Q 20/102 |
| | | | 705/40 |
| 2010/0153249 A1* | 6/2010 | Yuan | G06Q 20/3255 |
| | | | 705/34 |
| 2011/0010741 A1 | 1/2011 | Liao et al. | |
| 2011/0238570 A1* | 9/2011 | Li | G06O 30/06 |
| | | | 705/40 |
| 2012/0290472 A1* | 11/2012 | Mullen | G06Q 10/00 |
| | | | 705/39 |
| 2014/0006149 A1* | 1/2014 | Grigg | G06Q 20/387 |
| | | | 705/14.51 |
| 2014/0006183 A1* | 1/2014 | Grigg | G06Q 20/20 |
| | | | 705/16 |
| 2014/0006277 A1* | 1/2014 | Rao | G06O 20/3572 |
| | | | 705/41 |
| 2014/0129357 A1* | 5/2014 | Goodwin | G06Q 20/20 |
| | | | 705/16 |
| 2014/0279474 A1* | 9/2014 | Evans | G06Q 20/40 |
| | | | 705/41 |
| 2014/0279509 A1* | 9/2014 | Khilnani | G06Q 20/227 |
| | | | 705/44 |
| 2015/0134540 A1* | 5/2015 | Law | G06O 20/3578 |
| | | | 705/72 |
| 2015/0161597 A1* | 6/2015 | Subramanian | G06Q 20/0855 |
| | | | 705/41 |

FOREIGN PATENT DOCUMENTS

| | | | |
|---|---|---|---|
| CN | 101414375 A | 4/2009 | |
| CN | 101436273 A | 5/2009 | |
| CN | 101470874 A | 7/2009 | |
| WO | WO-2007032657 A1 * | 3/2007 | G07F 7/025 |

OTHER PUBLICATIONS

"Made in IBM Labs: Two-Factor Security for Mobile Transactions," PR Newswire [New York], Oct. 18, 2013 (Year: 2013).*

"Octopus sets up payments for Taobao Android-only service allows users to pay for goods up to a daily limit of HK$1,000", by Sophie Yu, South China Morning Post [Hong Kong], Feb. 19, 2014 (Year: 2014).*

International Search Report issued in corresponding International Application No. PCT/CN2015/080908, dated Sep. 9, 2015 (2 pages).

Chinese Office Action in corresponding Chinese Application No. 201410250035.0, dated Feb. 19, 2016 (10 pages).

* cited by examiner

ITEM TRANSFER APPARATUS, SYSTEM AND METHOD

CROSS REFERENCE TO RELATED APPLICATIONS

This application is a continuation of International Application No. PCT/CN2015/080908, filed on Jun. 5, 2015, which claims the benefit of priority to Chinese Patent Application No. 201410250035.0, entitled "Item Transfer Apparatus, System and Method," filed on Jun. 6, 2014. The entire disclosures of each of the above-identified applications are incorporated herein by reference in their entirety.

FIELD OF THE TECHNOLOGY

The present disclosure relates to the field of data processing, and in particular, to an item transfer apparatus, system and method.

BACKGROUND OF THE DISCLOSURE

With development of network technologies, mobile Internet applications related to item transfer are increasingly popular with users. The item transfer means that an item provider device releases item information in a network in advance, and after a user triggers a transfer operation of an item, the item to be transferred is acquired by transferring an exchange resource from a resource account associated with the user to a resource account associated with the item provider device.

At present, more and more terminals support a Near Field Communication (NFC) technology. The NFC technology is a technology evolved from Radio Frequency Identification (RFID). A user can complete item transfer by using an RFID card (e.g., a bus card) on a terminal. The item transfer method generally includes: pre-installing, by a user, an application related to an RFID card on a mobile phone, and binding his/her own RFID card to the mobile phone. When it is necessary to acquire a certain item, the user can acquire item information of the item on a computer and generate an order of the item according to the item information, and the order may correspond to an ID two-dimensional code; then, the user uses the mobile phone to scan the ID two-dimensional code, to make the mobile phone acquire the order of the item; and finally, the user uses the RFID card on the mobile phone to transfer an exchange resource, that is, the exchange resource is transfer from a first resource account corresponding to the RFID card to a second resource account associated with an item provider device, so as to acquire the item. The RFID card belongs to one kind of e-cards, and similar e-cards include NFC labels, non-contact IC cards and iBeacon.

During implementation of the present disclosure, the inventor finds that the technology at least has the following problems: the item transfer method not only requires a user to bind an e-card to a mobile phone in advance, but also, during acquisition, needs to perform multiple steps such as scanning an ID two-dimensional code, acquiring an order and transferring an exchange resource. The whole process is very cumbersome and has low efficiency, and the user can learn operation of the process only with a higher learning cost.

SUMMARY

To solve the problem that the item transfer method not only needs to bind an e-card to a mobile phone but also has cumbersome operations, embodiments of the present invention provide an item transfer apparatus, system and method. The technical solutions are as follows:

According to a first aspect, the embodiments of the present invention provide an item transfer apparatus, the apparatus including:

an instruction receiving module, configured to receive an order instruction of a target item sent by a terminal;

an order generation module, configured to generate an order of the target item, and feed back order information of the order to the terminal; so that the terminal sends a resource exchange instruction to a card management system according to the order information and a read e-card; and the card management system, according to the resource exchange instruction, transfers an exchange resource in a first resource account corresponding to the e-card to a second resource account corresponding to an order management system, and sends a resource transfer result to the order management system;

a transfer sending module, configured to send an item transfer instruction to an item provider device according to the resource transfer result; and a resource transfer module, configured to, after receiving an item transfer result fed back by the item provider device, transfer the exchange resource from the second resource account to a third resource account corresponding to the item provider device.

According to a second aspect, the embodiments of the present invention provide an item transfer apparatus, the apparatus including:

an order submission module, configured to send an order instruction of a target item to an order management system, so that the order management system, after receiving the order instruction, generates an order of the target item, and feeds back order information of the order; and a resource exchange module, configured to send a resource exchange instruction to a card management system according to the order information and a read e-card, so that the card management system, according to the resource exchange instruction, transfers an exchange resource in a first resource account corresponding to the e-card to a second resource account corresponding to the order management system, and sends a resource transfer result to the order management system; the order management system sends an item transfer instruction to an item provider device according to the resource transfer result; and the order management system, after receiving an item transfer result fed back by the item provider device, transfers the exchange resource from the second resource account to a third resource account corresponding to the item provider device according to the item transfer result.

According to a third aspect, the embodiments of the present invention provide an item transfer system, the system including a terminal, an order management system, a card management system and an item provider device, the terminal communicating with the order management system and the card management system through a wired network or wireless network, and the order management system respectively communicating with the card management system and the item provider device through the wired network or wireless network; and the terminal including the item transfer apparatus as described in the second aspect, and the order management system including the item transfer apparatus as described in the first aspect.

According to a fourth aspect, the embodiments of the present invention provide an item transfer system, the system including a terminal, a convergence management system, an order management system, a card management system and an item provider device, the terminal communicating with the convergence management system and the card management system through a wired network or wireless network, and the order management system respectively communicating with the convergence management system, the terminal and the card management system through the wired network or wireless network; the item provider device respectively communicating with the convergence management system and the terminal through the wired network or wireless network;

the terminal including:

an order submission module, configured to, when the local end and the order management system are connected through a convergence management system, send the order instruction to the convergence management system, so that the convergence management system forwards the order instruction to the order management system; send an order instruction of a target item to an order management system, so that the order management system, after receiving the order instruction, generates an order of the target item, and feeds back order information of the order; and a resource exchange module, configured to send a resource exchange instruction to a card management system according to the order information and a read e-card, so that the card management system, according to the resource exchange instruction, transfers an exchange resource in a first resource account corresponding to the e-card to a second resource account corresponding to the order management system, and sends a resource transfer result to the order management system; the order management system sends an item transfer instruction to an item provider device according to the resource transfer result; and the order management system, after receiving an item transfer result fed back by the item provider device, transfers the exchange resource from the second resource account to a third resource account corresponding to the item provider device according to the item transfer result; and the order management system including:

an instruction receiving module, configured to receive an order instruction of a target item sent by a terminal;

an order generation module, configured to generate an order of the target item, and feed back order information of the order to the terminal; so that the terminal sends a resource exchange instruction to a card management system according to the order information and a read e-card; and the card management system, according to the resource exchange instruction, transfers an exchange resource in a first resource account corresponding to the e-card to a second resource account corresponding to an order management system, and sends a resource transfer result to the order management system;

a transfer sending module, configured to, when the local end and the item provider device are connected through a convergence management system, send an item transfer instruction to the convergence management system according to the resource transfer result, so that the convergence management system forwards the item transfer instruction to the item provider device; and a resource transfer module, configured to, after receiving an item transfer result fed back by the item provider device, transfer the exchange resource from the second resource account to a third resource account corresponding to the item provider device.

According to a fifth aspect, the embodiments of the present invention provide an item transfer method, the method including:

sending, by a terminal, an order instruction of a target item to an order management system;

after receiving the order instruction, generating, by the order management system, an order of the target item, and feeding back order information of the order to the terminal;

sending, by the terminal, a resource exchange instruction to a card management system according to the order information and a read e-card;

transferring, by the card management system, according to the resource exchange instruction, an exchange resource in a first resource account corresponding to the e-card to a second resource account corresponding to the order management system, and sending a resource transfer result to the order management system; and sending, by the order management system, an item transfer instruction to an item provider device according to the resource transfer result; and, after receiving an item transfer result fed back by the item provider device, transferring the exchange resource from the second resource account to a third resource account corresponding to the item provider device according to the item transfer result.

According to a sixth aspect, the embodiments of the present invention provide an item transfer method, the method including:

sending an order instruction of a target item to an order management system, so that the order management system, after receiving the order instruction, generates an order of the target item, and feeds back order information of the order; and sending a resource exchange instruction to a card management system according to the order information and a read e-card, so that the card management system, according to the resource exchange instruction, transfers an exchange resource in a first resource account corresponding to the e-card to a second resource account corresponding to the order management system, and sends a resource transfer result to the order management system; sending, by the order management system, an item transfer instruction to an item provider device according to the resource transfer result; and, after receiving an item transfer result fed back by the item provider device, transferring, by the order management system, the exchange resource from the second resource account to a third resource account corresponding to the item provider device according to the item transfer result.

According to a seventh aspect, the embodiments of the present invention provide an item transfer method, the method including:

receiving an order instruction of a target item sent by a terminal;

generating an order of the target item, and feeding back order information of the order to the terminal; so that the terminal sends a resource exchange instruction to a card management system according to the order information and a read e-card; and the card management system, according to the resource exchange instruction, transfers an exchange resource in a first resource account corresponding to the e-card to a second resource account corresponding to an order management system, and sends a resource transfer result to the order management system;

sending an item transfer instruction to an item provider device according to the resource transfer result; and after receiving an item transfer result fed back by the item provider device, transferring the exchange resource from the second resource account to a third resource account corresponding to the item provider device.

The beneficial effects brought about by the technical solutions provided in the embodiments of the present invention are as follows:

By sending, by a terminal, an order instruction of a target item to an order management system, feeding back, by the order management system, order information of an order to the terminal, sending, by the terminal, a resource exchange instruction to a card management system according to the order information and a read e-card, completing, by the card management system, transfer of the exchange resource, sending, by the order management system, an item transfer instruction to an item provider device according to a resource transfer result, and completing, by the item provider device, transfer of the target item, the present disclosure solves the problem that the current item transfer method not only needs to bind an e-card to a mobile phone but also has cumbersome operations; thereby achieving an effect that a user can acquire a target item through the e-card after directly making an order at a terminal without pre-binding or scanning a two-dimensional code or other additional operations.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

To make the objective, technical solutions and advantages of the present disclosure more clear, implementations of the present disclosure are further described below in detail with reference to the accompanying drawings.

Figure 1:
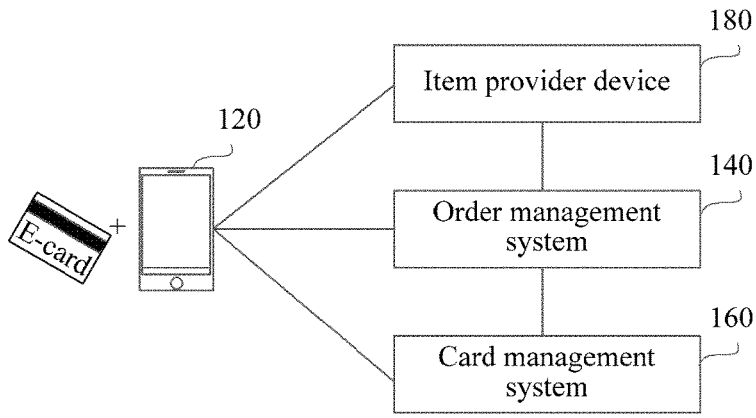
FIG. 1 is a schematic structural diagram of an implementation environment involved in an item transfer method according to one part of the embodiments of the present invention.

Referring to FIG. 1, FIG. 1 is a schematic structural diagram of an implementation environment involved in an item transfer method according to one part of the embodiments of the present invention. The implementation environment includes at least one terminal 120, an order management system 140, a card management system 160 and at least one item provider device 180.

The terminal 120 may be a mobile phone, a tablet computer, an e-book reader, a MP3 (Moving Picture Experts Group Audio Layer III) player, a MP4 (Moving Picture Experts Group Audio Layer IV) player, a portable laptop computer, a desktop computer or the like. The terminal 120 is an electronic device used by a user. In the embodiment of the present invention, the terminal 120 may be a mobile terminal that supports a NFC technology and/or a Bluetooth technology and/or an infrared technology and/or a wireless fidelity (WIFI) technology, which has capability of reading an external e-card through non-contact reading. The e-card includes RFID cards, NFC cards, non-contact IC cards (Integrated Circuit Cards) and iBeacon produced by Apple.

A client runs in the terminal 120, and the client may be a client having an e-card exchange function, or a client having both an e-card exchange function and a social function. For example, the client may be the mobile phone QQ client or WeChat client provided by China's Tencent Technology Co., LTD., the taobao client provided by China's Alibaba.com Inc., the Jingdong client provided by China's Jingdong 360 Du E-Commerce LTD. and the like.

The terminal 120 and the order management system 140 may communicate with each other through a wireless network or wired network.

The order management system 140 may be a server, or a server cluster consisting of several servers, or a cloud computing service center. The order management system 140 is configured to interact with the terminal 120 to provide NFC-based electronic exchange services. The order management system 140 may be set separately, or may be set by a comprehensive Internet service provider, for example, the order management system may be set by China's Tencent Technology Co., LTD., and is integrated to be an integral part of comprehensive Internet service QQ.

The order management system 140 and the card management system 160 may communicate with each other through a wireless network or wired network.

The card management system 160 may be a server, or a server cluster consisting of several servers, or a cloud computing service center. The card management system 160 is configured to perform resource management related to e-cards, and resource transfer between different resource accounts. The card management system 160 is generally set by an e-card management institution, for example, a bus card group, a metrocard group, a campus card group, a one-card group or the like.

The order management system 140 further communicates with the at least one item provider device 180 through a wireless network or wired network.

The item provider device 180 is a device used by an item provider. In different embodiments, the item provider device

180 may be a mobile phone, a tablet computer, an e-card reader, a MP3 player, a MP4 player, a portable laptop computer and a desktop computer. The item provider device 180 may also be a server, or a server cluster consisting of several servers, or a cloud computing service center. The item provider device 180 is configured to provide virtual items or real items in the client of the terminal 120.

Several terms involved in the embodiments of the present invention are described below:

The term "target item" refers to an item that a user hopes to acquire, which may be a virtual item, such as an electronic coupon, an e-book or a redeem code; or may be a real item or service, such as daily life supplies, food, life service and movie and TV service. The target item is generally provided by an item provider, and the item provider generally refers to an organization, an individual or represents an organization.

The term "exchange resource" refers to a resource used by the user during exchange of an item, which includes, but is not limited to, user integral, credit score, virtual currency, virtual items, electronic numerical values or material money.

The term "transfer channel" refers to a channel used when an exchange resource is transferred between different resource accounts, the transfer channel may vary according to a different exchange resource, for example, the transfer channel corresponding to the user integral may be an intra-forum transfer channel; the transfer channel corresponding to the virtual currency may be an e-commerce channel; and the transfer channel may also vary according to different types of resource accounts, for example, an A resource account provided by Company A needs to use a transfer channel provided by Company A; and a B resource account provided by Company B needs to use a transfer channel provided by Company B.

The item transfer solutions according to the embodiments of the present invention are introduced and described below in detail through several different embodiments.

Figure 2:
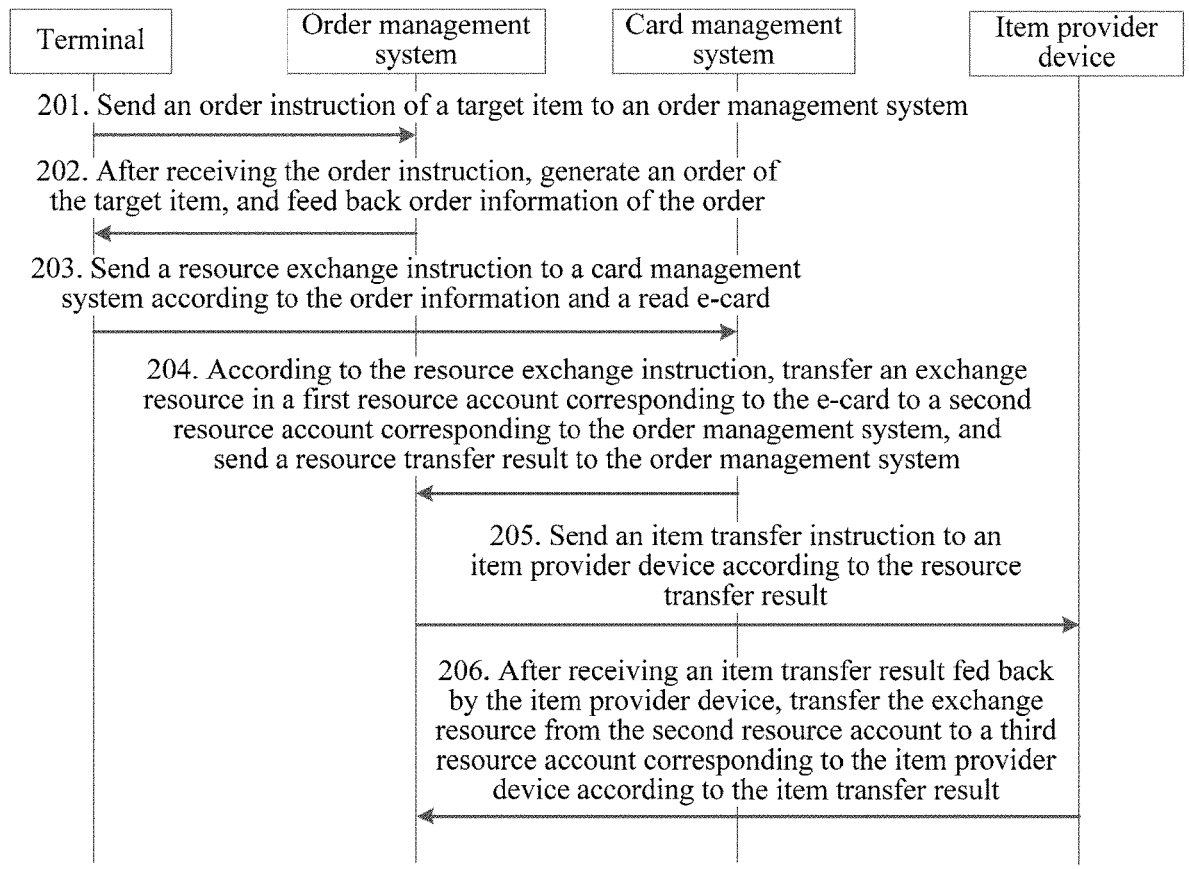
FIG. 2 is a method flowchart of an item transfer method according to one embodiment of the present invention.

Referring to FIG. 2, FIG. 2 is a method flowchart of an item transfer method according to one embodiment of the present invention. This embodiment is illustrated by taking that the item transfer method is applied to the implementation environment shown in FIG. 1 as an example. The method includes:

step 201. sending, by a terminal, an order instruction of a target item to an order management system;

step 202, after receiving the order instruction, generating, by the order management system, an order of the target item, and feeding back order information of the order to the terminal;

step 203. sending, by the terminal, a resource exchange instruction to a card management system according to the order information and a read e-card;

step 204. transferring, by the card management system, according to the resource exchange instruction, an exchange resource in a first resource account corresponding to the e-card to a second resource account corresponding to an order management system, and sending a resource transfer result to the order management system; and step 205. sending, by the order management system, an item transfer instruction to an item provider device according to the resource transfer result; and step 206. after receiving an item transfer result fed back by the item provider device, transferring, by the order management system, the exchange resource from the second resource account to a third resource account corresponding to the item provider device according to the item transfer result.

To sum up, the item transfer method in this embodiment, by sending, by a terminal, an order instruction of a target item to an order management system, feeding back, by the order management system, order information of an order to the terminal, sending, by the terminal, a resource exchange instruction to a card management system according to the order information and a read e-card, completing, by the card management system, transfer of an exchange resource, sending, by the order management system, an item transfer instruction to an item provider device according to a resource transfer result, and completing, by the item provider device, transfer of the target item, solves the problem that the current item transfer method not only needs to bind an e-card to a mobile phone but also has cumbersome operations; thereby achieving an effect that a user can acquire a target item through the e-card after directly making an order at a terminal without pre-binding or scanning a two-dimensional code or other additional operations.

In the embodiment, the step related to the terminal can be separately implemented as an item transfer method at the terminal, the step related to the order management system can be separately implemented as an item transfer method at the order management system, the step related to the card management system can be separately implemented as an item transfer method at the card management system, and the step related to the item provider device can be separately implemented as an item transfer method at the item provider device.

Figure 3A:
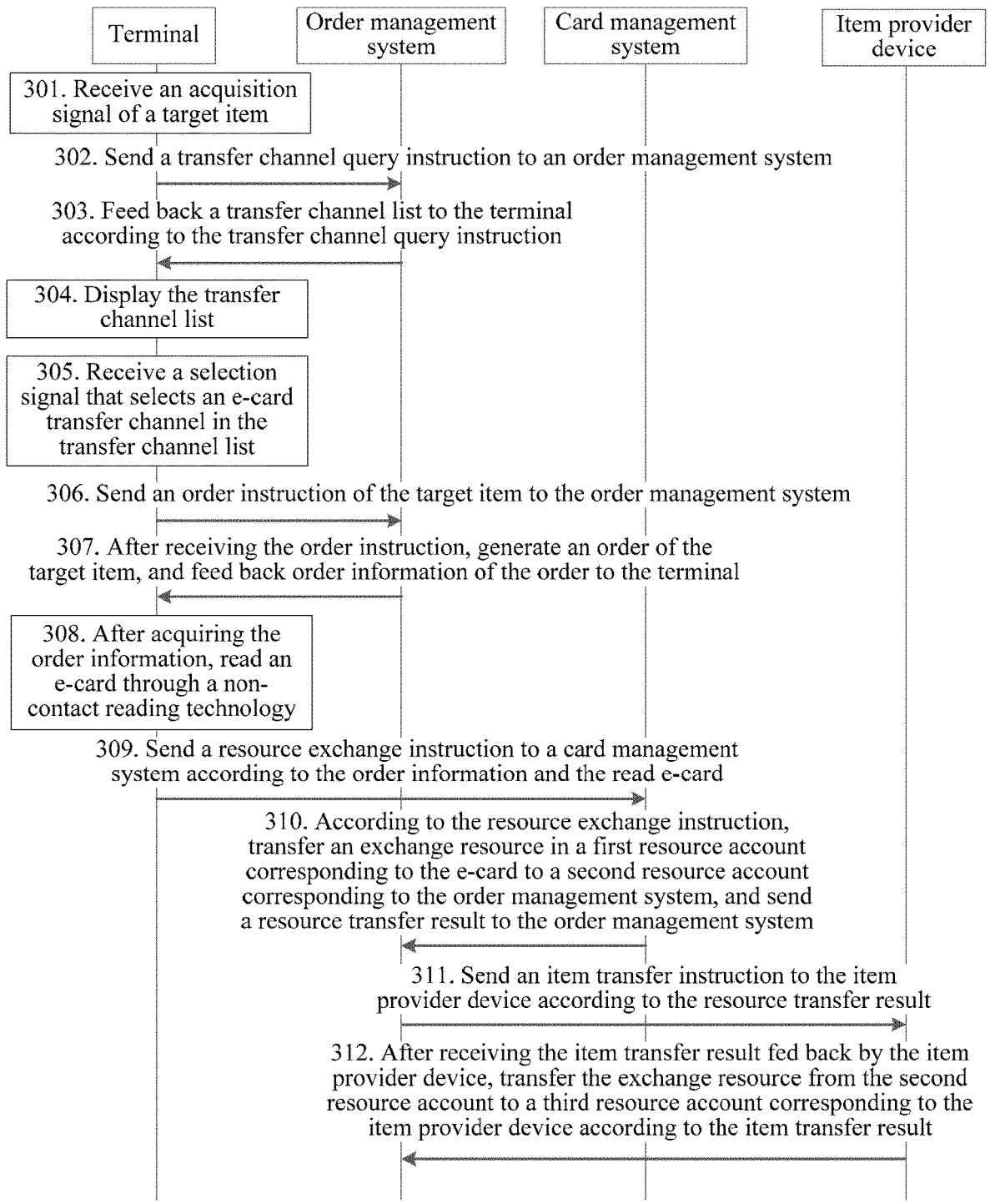
FIG. 3A is a method flowchart of an item transfer method according to another embodiment of the present invention.

Referring to FIG. 3A, FIG. 3A is a method flowchart of an item transfer method according to another embodiment of the present invention. This embodiment is illustrated by taking that the item transfer method is applied to the implementation environment shown in FIG. 1 as an example. The method includes:

Step 301. A terminal receives an acquisition signal of a target item.

The terminal displays an acquisition page of the target item to a user, and then receives the user's acquisition signal for the target item in the acquisition page. The acquisition page of the target item may be previously provided in a client of the terminal by an item provider device.

Figure 3B:
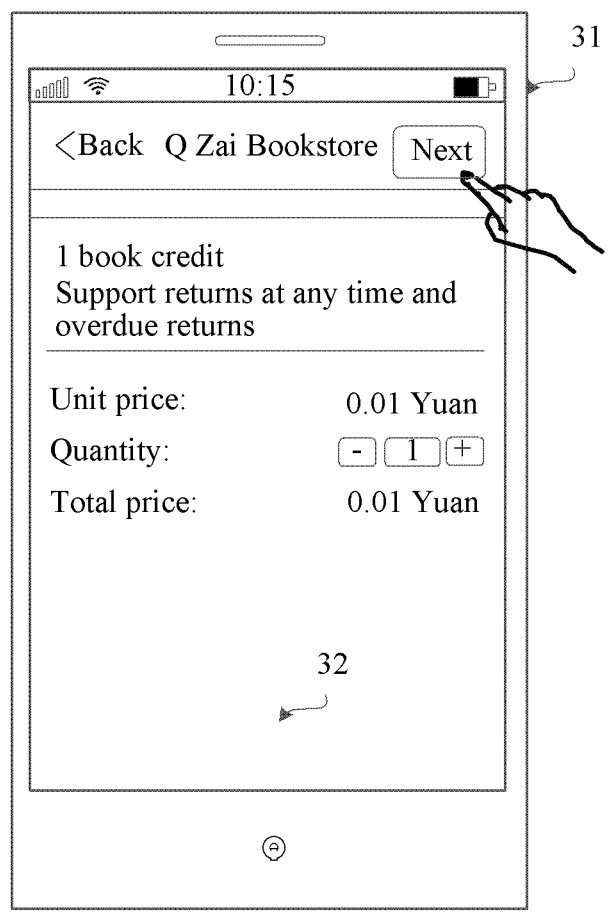
FIG. 3B to FIG. 3E are schematic diagrams of an interface where the item transfer method provided in FIG. 3A is specifically implemented on a terminal.

For example, referring to FIG. 3B, the user can use a mobile phone 31 to browse an acquisition page 32 of a target item "book credit", and the acquisition page 32 is provided in the client previously by the item provider device.

Step 302. The terminal sends a transfer channel query instruction to an order management system.

When the user needs to acquire the target item, the terminal sends a transfer channel query instruction to an order management system. The transfer channel refers to a channel through which an exchange resource is transferred, such as a bus card, a metrocard, a campus card and a one-card. Specifically, the step may include the following sub-steps:

1. The terminal acquires all or some information in a service type corresponding to the target item, a current geographic position and hardware support capability of the terminal.

The terminal can acquire the current geographic position through Location Based Services (LBSs). The terminal can acquire its own hardware support capability by reading hardware information or terminal information, and the hardware support capability mainly includes: whether the NFC technology is supported, whether the Bluetooth technology is supported, whether the WIFI technology is supported, and whether the infrared technology is supported. That is, the hardware support capability refers to the terminal's support capability for reading an external e-card through a non-contact reading technology.

2. The terminal carries the acquired information in the transfer channel query instruction to be sent to the order management system.

Correspondingly, the order management system receives the transfer channel query instruction sent by the terminal, and the transfer channel query instruction carries the service type, the current geographic position and/or the hardware support capability of the terminal.

For example, referring to FIG. 3B, when the user clicks the "next" button in the acquisition page 32, the terminal receives the click signal, and then sends the transfer channel query instruction to the order management system.

Step 303. The order management system feeds back a transfer channel list to the terminal according to the transfer channel query instruction.

When the transfer channel query instruction carries the service type corresponding to the target item, the current geographic position of the terminal and/or the hardware support capability of the terminal, the order management system determines a transfer channel list supported by the terminal according to the information carried in the transfer channel query instruction, the transfer channel list including at least one resource transfer channel supported by the terminal.

That is, by taking that the transfer channel query instruction carries the service type corresponding to the target item, the current geographic position of the terminal and the hardware support capability of the terminal at the same time as an example, The order management system determines a resource transfer channel supported by the service type according to the service type corresponding to the target item; for example, an A service type supports use of an RFID card transfer channel, and a B service type does not support use of the RFID card transfer channel.

The order management system determines a resource transfer channel supported by the current geographic position according to the current geographic position of the terminal; for example, Beijing area supports use of an XX bus card transfer channel but does not support a Shanghai metrocard transfer channel; while Shanghai area supports the Shanghai metrocard transfer channel but does not support the XX bus card transfer channel.

The order management system determines a resource transfer channel supported by the hardware support capability of the terminal according to the hardware support capability of the terminal; for example, a terminal of Model A supports an NFC technology, while a terminal of Model B does not support the NFC technology.

The order management system performs an intersection operation on the resource transfer channels respectively determined according to the three kinds of information, to obtain a transfer channel list supported by the terminal, the transfer channel list including at least one resource transfer channel supported by the terminal.

Correspondingly, the terminal receives the transfer channel list fed back by the order management system.

Step 304. The terminal displays the transfer channel list.

The terminal can display the transfer channel list in a list form in a user interaction interface of the client.

Figure 3C:
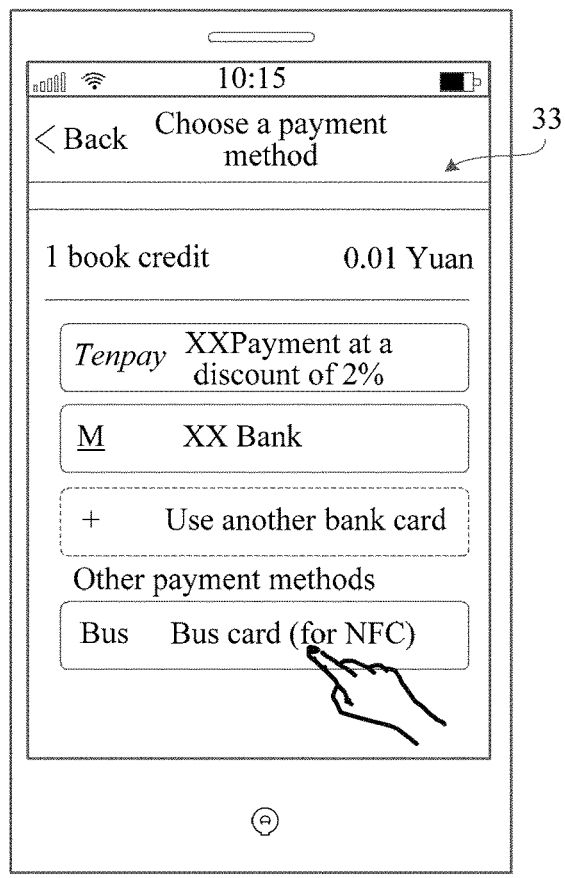

For example, referring to FIG. 3C, the terminal can display a transfer channel list "XX bus card" in a list form in a user interaction interface 33.

Step 305. The terminal receives a selection signal indicating selection of an e-card transfer channel in the transfer channel list.

The user can select a transfer channel used this time in the transfer channel list displayed by the terminal, for example, an e-card transfer channel. The terminal receives a selection signal indicating selection of the e-card transfer channel in the transfer channel list, and the terminal regards the selection signal as an order signal.

Step 306. The terminal sends an order instruction of the target item to the order management system.

After receiving a selection signal indicating that the user selects an e-card transfer channel in the transfer channel list, the terminal sends an order instruction of the target item to the order management system. The order instruction at least carries: a user ID, a target provider ID, a target item ID, the number of the target item, a resource value corresponding to a single target item or total resource values corresponding to a plurality of target items.

The terminal may acquire the user ID from a login state of the client. The terminal may also acquire an ID input or designated by the user as the user ID. The terminal may also acquire the target provider ID, the target item ID, the number of the target item, and the unit price or the total price of the target item from an acquisition page of the target item.

Step 307. After receiving the order instruction, the order management system generates an order of the target item, and feeds back order information of the order to the terminal.

After receiving the order instruction, the order management system generates an order of the target item. Then the order management system stores the order, and feeds back order information of the order to the terminal.

The order information fed back herein at least needs to include: an order number, and values of exchange resources to be transferred in the order.

Step 308. After acquiring the order information, the terminal reads an e-card through a non-contact reading technology.

The non-contact reading technology includes any one of a NFC technology, a WIFI technology, a Bluetooth technology and an infrared technology. The e-card includes RFID cards, NFC cards, non-contact IC cards (Integrated Circuit Cards) and iBeacon produced by Apple. This embodiment is mainly illustrated by taking that the non-contact reading technology is a NFC technology and the e-card is an RFID card as an example.

After the terminal acquires the order information, the user is required to attach the e-card to a reading part on the terminal to read information of the card. The e-card herein does not need to be bound to the user ID currently logged on to the terminal, and any e-card is suitable.

Figure 3D:
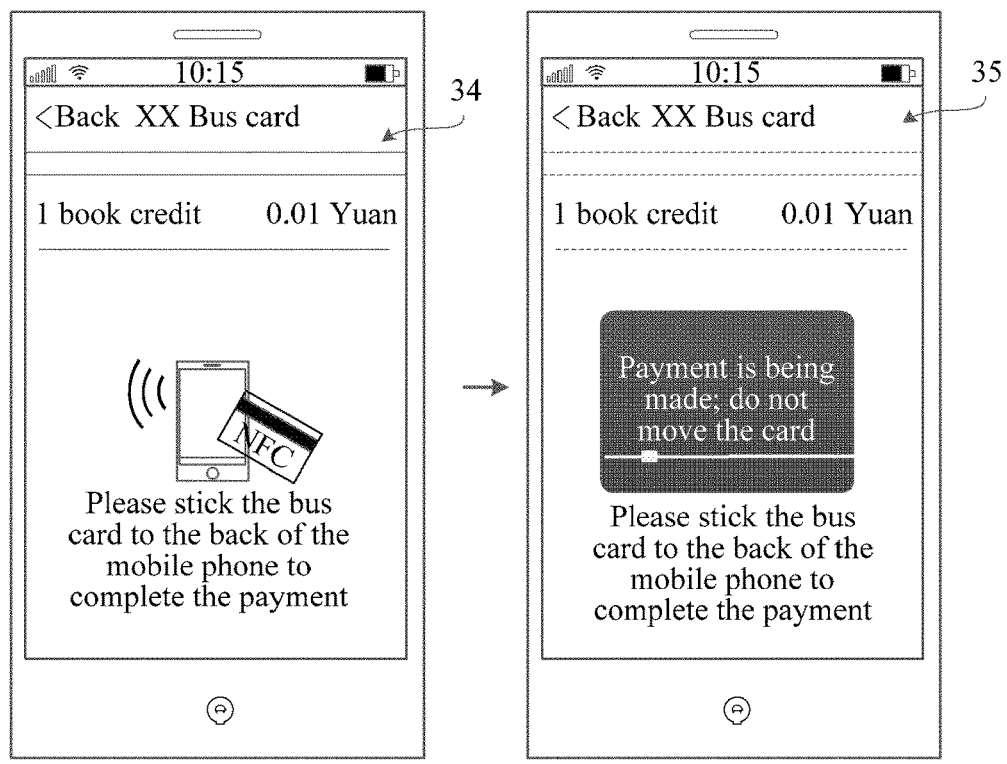

For example, referring to FIG. 3D, the terminal, in a user interaction interface 34, prompts the user to stick a bus card to the back of a mobile phone to complete reading of the information of the card. Moreover, when the e-card is detected, in a user interaction interface 35, the user is prompted not to move the e-card, so as to ensure smooth completion of the process of reading the information of the card.

Step 309. The terminal sends a resource exchange instruction to a card management system according to the order information and the read e-card.

The terminal sends a resource exchange instruction to a card management system according to the order information fed back by the order management system and the read e-card.

It should be noted that, when sending the resource exchange instruction to the card management system, the terminal at least needs to carry the order number and the values of exchange resources to be transferred in the order in the resource exchange instruction.

Step 310. The card management system, according to the resource exchange instruction, transfers an exchange resource in a first resource account corresponding to the e-card to a second resource account corresponding to the order management system, and sends a resource transfer result to the order management system.

The resource transfer result usually carries: an order number, an ID indicating whether the transfer is successful, and the value of the transferred exchange resource of the order.

It should be noted that, the card management system does not directly transfer the exchange resource from the exchange resource in the first resource account corresponding to the e-card to a third resource account corresponding to the item provider device, but transfers the exchange resource from the exchange resource in the first resource account corresponding to the e-card to a second resource account corresponding to the order management system for temporary storage.

Figure 3E:
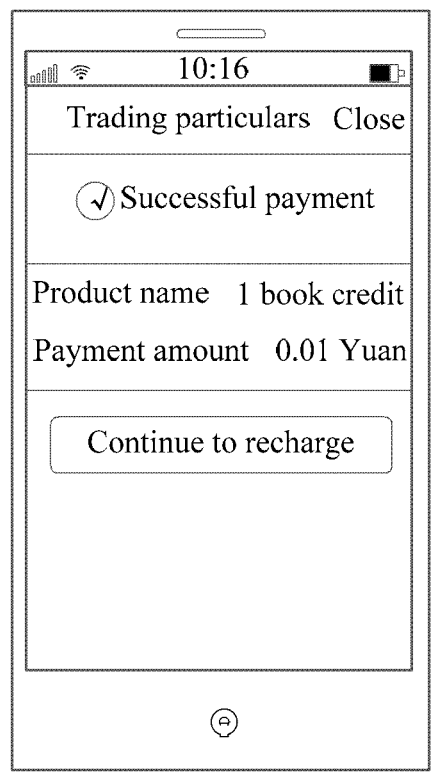

In the meantime, the card management system may also send a resource transfer result to the terminal, the terminal, after the received resource transfer result indicates that the exchange resource has been successfully transferred from the exchange resource in the first resource account corresponding to the e-card to the second resource account corresponding to the order management system, displays prompt information, and the prompt information may be as shown in FIG. 3E.

Step 311. The order management system sends an item transfer instruction to the item provider device according to the resource transfer result.

The order management system, after the resource transfer result indicates that the exchange resource has been successfully transferred from the exchange resource in the first resource account corresponding to the e-card to the second resource account corresponding to the order management system, stores the resource transfer result based on the order number, and sends an item transfer instruction to the item provider device. The item transfer instruction generally includes: a user ID, an item provider ID, a target item ID and the number of the target item.

After receiving the item transfer instruction, the item provider device transfers a virtual item or real item from an item provider to the user. Then, the item provider device sends an item transfer result to the order management system.

Step 312. After receiving the item transfer result fed back by the item provider device, the order management system transfers the exchange resource from the second resource account to a third resource account corresponding to the item provider device according to the item transfer result.

The item transfer result generally includes: an order number and an ID indicating whether the transfer is successful. After the received item transfer result indicates that item transfer has succeeded, the order management system transfers the exchange resource from the second resource account to a third resource account corresponding to the item provider device.

To sum up, the item transfer method in this embodiment, by sending, by a terminal, an order instruction of a target item to an order management system, feeding back, by the order management system, order information of an order to the terminal, sending, by the terminal, a resource exchange instruction to a card management system according to the order information and a read e-card, completing, by the card management system, transfer of the exchange resource, sending, by the order management system, an item transfer instruction to an item provider device according to a resource transfer result, and completing, by the item provider device, transfer of the target item, solves the problem that the current item transfer method not only needs to bind an e-card to a mobile phone but also has cumbersome operations; thereby achieving an effect that a user can acquire a target item through the e-card after directly making an order at a terminal without pre-binding or scanning a two-dimensional code or other additional operations.

In other words, in the item transfer method provided in the prior art, the user can complete acquisition of a target item only by going through a plurality of steps such as binding, scanning a two-dimensional code, selecting a transfer channel, verifying whether an e-card is a bound card, and transferring an exchange resource by using the bound e-card; however, it can be known according to FIG. 3B and FIG. 3C that the item transfer method provided in FIG. 3A can complete acquisition of the target item only if the user directly uses the e-card to transfer the exchange resource after selecting a transfer channel, and the whole process can be completed only if the user "selects a target item, selects a transfer channel, and transfers an exchange resource by using the e-card", which can be smoothly completed even by users such as the elderly or children and does not require a too high learning cost.

It should be additionally noted that, after step 311, as the item transfer result may be lost due to network failure or signaling interaction failure, it is likely that the order management system does not receive the item transfer result, and at this time, the embodiment may further include:

if the item transfer result corresponding to the order is not received within an appointed time period, resending, by the order management system, the item transfer instruction to the item provider device with respect to the order.

The appointed time period may be every day, that is, the order management system checks whether corresponding item transfer results have been received for all orders of the day every day, and if an item transfer result is not received for a certain order, the order management system needs to resend the item transfer instruction to the item provider device with respect to the order.

It should be additionally noted that, after step 309, as the resource transfer result may be lost due to network failure or signaling interaction failure, it is likely that the order management system does not receive the resource transfer result, and at this time, the embodiment may further include:

performing, by the order management system, order check with the item provider device every other predetermined time interval, and when checking that transfer of the exchange resource has been completed but the resource transfer result has not been received for the order, reissuing the item transfer instruction to the item provider device with respect to the order.

The predetermined time interval may also be every day, that is, the order management system performs order check with the item provider device every day, and when checking that transfer of the exchange resource has been completed but the resource transfer result has not been received for the order, reissues the item transfer instruction to the item provider device with respect to the order.

It should be additionally noted that, it can be known according to the embodiment that the card management system, when transferring the exchange resource, only needs to transfers the exchange resource from the exchange resource in the first resource account corresponding to the e-card to the second resource account corresponding to the order management system for temporary storage, and thus the card management system can complete the resource transfer process only if it knows an order number and values of exchange resources to be transferred in the order. To this end, step 307 to step 309 may be implemented in many manners:

In a first possible implementation, the order management system directly feeds back the order number and the values of exchange resources to be transferred in the order to the terminal, the terminal reads an e-card through a non-contact reading technology, and the terminal sends a resource exchange instruction to the card management system according to the order number, the values of exchange resources to be transferred in the order and the read e-card, that is, the implementation provided in FIG. 3A.

In a second possible implementation, the order management system feeds back all order information to the terminal, the terminal reads an e-card through a non-contact reading technology, and the terminal sends a resource exchange instruction to the card management system according to all order information and the read e-card. At this time, it is feasible that the card management system only uses the order number and the values of exchange resources to be transferred in the order in all the order information during transfer of the exchange resource, and other order information can be used for providing customer services.

In a third possible implementation, the order management system only first feeds back the order number as order information to the terminal, and the terminal, when the received order information only includes the order number, sends an order query instruction to the order management system, wherein the order query instruction is used for querying for order information of the order of the target item, and the order information to be queried for at least includes values of exchange resources corresponding to the target item; the order management system receives the order query instruction sent by the terminal, and feeds back the order information of the order of the target item to the terminal. The terminal reads an e-card through a non-contact reading technology, and the terminal generates a resource exchange instruction according to the order information and information of the read e-card, and sends the resource exchange instruction to the card management system. At this time, it is feasible that the card management system only uses the order number and the values of exchange resources to be transferred in the order in all the order information during transfer of the exchange resource, and other order information can be used for providing customer services.

In the embodiment, the step related to the terminal can be separately implemented as an item transfer method at the terminal, the step related to the order management system can be separately implemented as an item transfer method at the order management system, the step related to the card management system can be separately implemented as an item transfer method at the card management system, and the step related to the item provider device can be separately implemented as an item transfer method at the item provider device.

Figure 4:
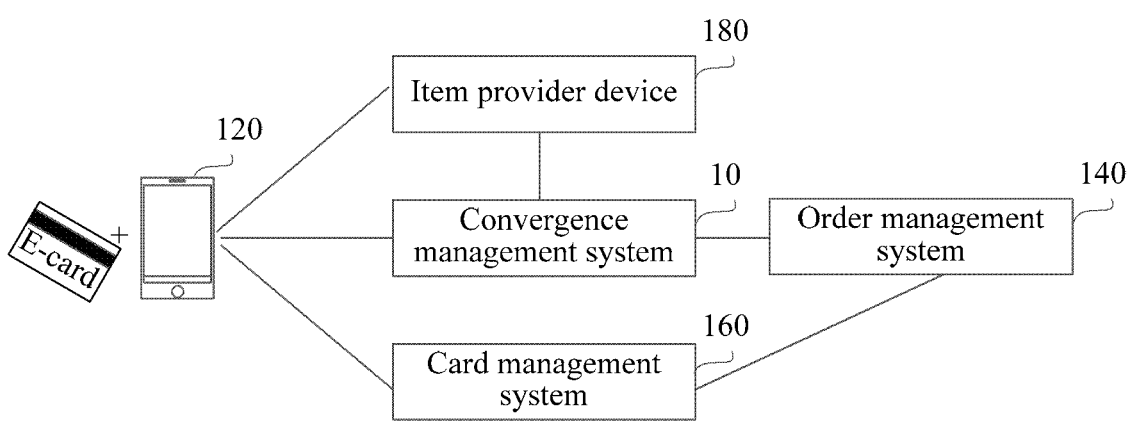
FIG. 4 is a schematic structural diagram of an implementation environment involved in an item transfer method according to another part of the embodiments of the present invention.

Referring to FIG. 4, FIG. 4 is a schematic structural diagram of an implementation environment involved in an item transfer method according to another part of the embodiments of the present invention. The implementation environment includes at least one terminal 120, an order management system 140, a card management system 160, a convergence management system 10 and at least one item provider device 180.

Different form the implementation environment shown in FIG. 1, a convergence management system 10 is added to the implementation environment. The convergence management system 10 may be a server, or a server cluster consisting of several servers, or a cloud computing service center. The convergence management system 10 is equivalent to a "transit" and "statistical" system.

Therefore, when the order management system 140 is integrated as an integral part in comprehensive Internet services, in order to be organically combined with other parts, the order management system 140 cannot directly interact with the terminal 120 and the at least one item provider device 180 in most steps of acquiring the target item, and needs to complete interaction with the terminal 120 and the at least one item provider device 180 through "transit" of the convergence management system 10. At this time, other parts responsible for other businesses in the comprehensive Internet services may also complete interaction with the terminal 120 and the at least one item provider device 180 through "transit" of the convergence management system 10. The convergence management system 10 further needs to complete some statistical transactions at the same time.

Figure 5:
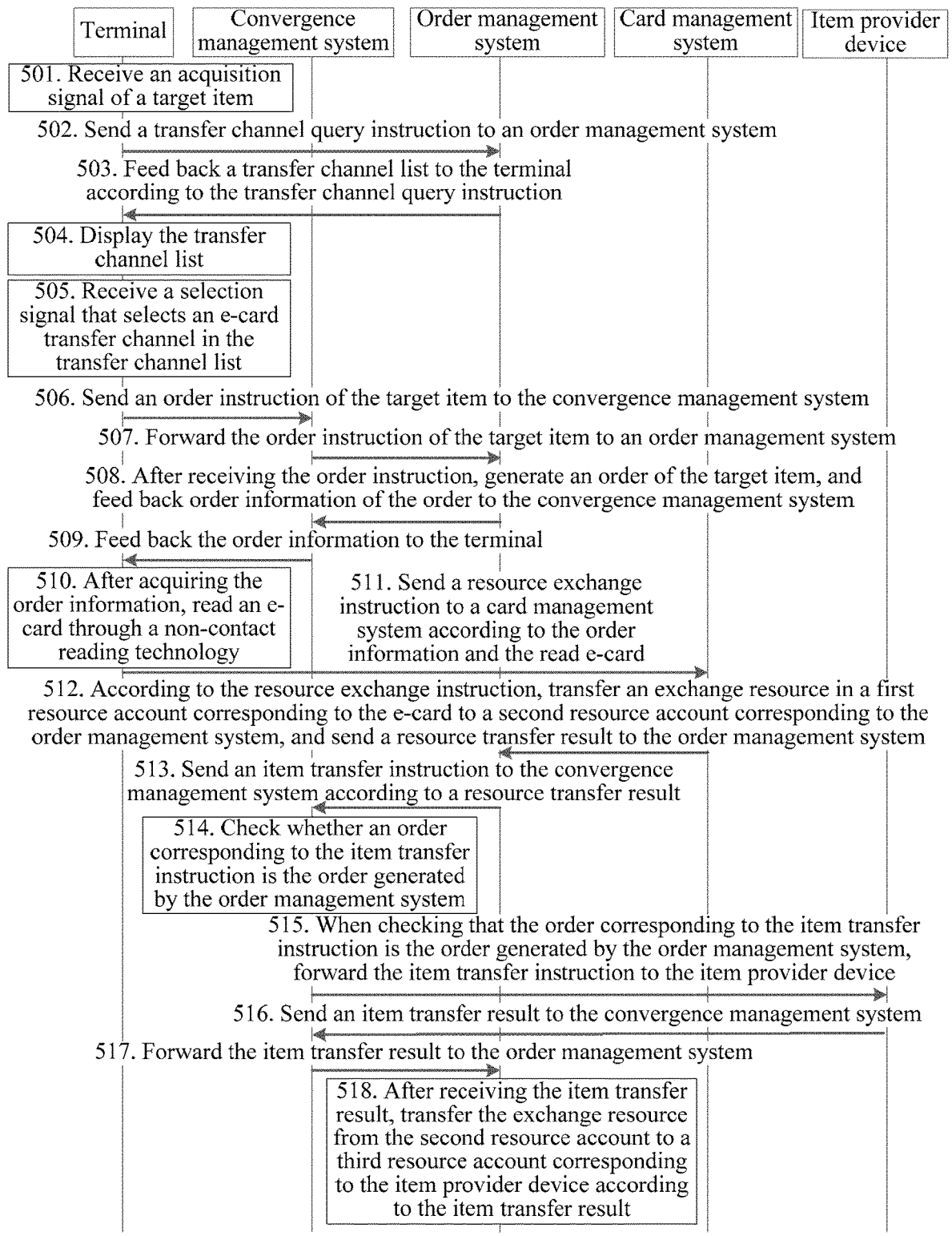
FIG. 5 is a method flowchart of an item transfer method according to another embodiment of the present invention.

Referring to FIG. 5, FIG. 5 is a method flowchart of an item transfer method according to another embodiment of the present invention. This embodiment is illustrated by taking that the item transfer method is applied to the implementation environment shown in FIG. 4 as an example. The method includes:

Step 501. A terminal receives an acquisition signal of a target item.

The terminal displays an acquisition page of the target item to a user, and then receives the user's acquisition signal for the target item in the acquisition page. The acquisition page of the target item may be previously provided in a client of the terminal by an item provider device.

Step 502. The terminal sends a transfer channel query instruction to an order management system.

When the user needs to acquire the target item, the terminal sends a transfer channel query instruction to an order management system. The transfer channel refers to a channel through which an exchange resource is transferred, such as a bus card, a metrocard, a campus card and a one-card. Specifically, the step may include the following sub-steps:

1. The terminal acquires all or some information in a service type corresponding to the target item, a current geographic position and hardware support capability of the terminal.

The terminal can acquire the current geographic position through LBSs. The terminal can acquire its own hardware support capability by reading hardware information or terminal information, and the hardware support capability mainly includes: whether the NFC technology is supported, whether the Bluetooth technology is supported, whether the WIFI technology is supported, and whether the infrared technology is supported. That is, the hardware support capability refers to the terminal's support capability for reading an external e-card through a non-contact reading technology.

2. The terminal carries the acquired information in the transfer channel query instruction to be sent to the order management system.

Correspondingly, the order management system receives the transfer channel query instruction sent by the terminal, and the transfer channel query instruction carries the service type, the current geographic position and/or the hardware support capability of the terminal.

Step 503. The order management system feeds back a transfer channel list to the terminal according to the transfer channel query instruction, the transfer channel list including at least one resource transfer channel supported by the terminal.

When the transfer channel query instruction carries the service type corresponding to the target item, the current geographic position of the terminal and/or the hardware support capability of the terminal, the order management system determines a transfer channel list supported by the terminal according to the information carried in the transfer channel query instruction.

That is, by taking that the transfer channel query instruction carries the service type corresponding to the target item, the current geographic position of the terminal and the hardware support capability of the terminal at the same time as an example, The order management system determines a resource transfer channel supported by the service type according to the service type corresponding to the target item; for example, an A service type supports use of an RFID card transfer channel, and a B service type does not support use of the RFID card transfer channel.

The order management system determines a resource transfer channel supported by the current geographic position according to the current geographic position of the terminal; for example, Beijing area supports use of an XX bus card transfer channel but does not support a Shanghai metrocard transfer channel; while Shanghai area supports the Shanghai metrocard transfer channel but does not support the XX bus card transfer channel.

The order management system determines a resource transfer channel supported by the hardware support capability of the terminal according to the hardware support capability of the terminal; for example, a terminal of Model A supports an NFC technology, while a terminal of Model B does not support the NFC technology.

The order management system performs an intersection operation on the resource transfer channels respectively determined according to the three kinds of information, to obtain a transfer channel list supported by the terminal, the transfer channel list including at least one resource transfer channel supported by the terminal.

Correspondingly, the terminal receives the transfer channel list fed back by the order management system.

Step 504. The terminal displays the transfer channel list.

The terminal can display the transfer channel list in a list form in a user interaction interface of the client.

Step 505. The terminal receives a selection signal indicating selection of an e-card transfer channel in the transfer channel list.

The user can select a transfer channel used this time in the transfer channel list displayed by the terminal, for example, an e-card transfer channel. The terminal receives a selection signal indicating selection of the e-card transfer channel in the transfer channel list, and the terminal regards the selection signal as an order signal.

Step 506. The terminal sends an order instruction of the target item to the convergence management system.

After receiving a selection signal indicating that the user selects an e-card transfer channel in the transfer channel list, the terminal sends an order instruction of the target item to the convergence management system. The order instruction at least carries: a user ID, a target provider ID, a target item ID, the number of the target item, a resource value corresponding to a single target item or total resource values corresponding to a plurality of target items.

The terminal may acquire the user ID from a login state of the client. The terminal may also acquire an ID input or designated by the user as the user ID. The terminal may also acquire the target provider ID, the target item ID, the number of the target item, and the unit price or the total price of the target item from an acquisition page of the target item.

Step 507. The convergence management system forwards the order instruction of the target item to an order management system.

After receiving the order instruction sent by the terminal, the convergence management system forwards the order instruction of the target item to an order management system.

Step 508. After receiving the order instruction, the order management system generates an order of the target item, and feeds back order information of the order to the convergence management system.

After receiving the order instruction, the order management system generates an order of the target item. The generated order includes an order number, and then the order management system stores the order and at least feeds back order information of the order to the convergence management system.

The order information herein at least needs to include: an order number and values of exchange resources to be transferred in the order. It should be noted that, the order number of the same order may be only one or may also be two. When the order number of the same order is two, one order number is used for identifying the order between the convergence management system and the order management system; the other order number is used for identifying the order between the order management system and the card management system. However, in order to simplify the description, this embodiment is illustrated only by taking that the order number of the same order is one as an example, and the situation where the order number of the same order is two is the content that can be easily thought of by a person skilled in the art based on this embodiment, which is not repeated herein.

Step 509. The convergence management system feeds back the order information to the terminal.

Step 510. After acquiring the order information, the terminal reads an e-card through a non-contact reading technology.

The non-contact reading technology includes any one of a NFC technology, a WIFI technology, a Bluetooth technology and an infrared technology. The e-card includes RFID cards, NFC cards, non-contact IC cards (Integrated Circuit Cards) and iBeacon produced by Apple. This embodiment is mainly illustrated by taking that the non-contact reading technology is a NFC technology and the e-card is an RFID card as an example.

After the terminal acquires the order information, the user is required to attach the e-card to a reading part on the terminal to read information of the card. The e-card herein does not need to be bound to the user ID currently logged on to the terminal, and any e-card is suitable.

Step 511. The terminal sends a resource exchange instruction to a card management system according to the order information and the read e-card.

The terminal sends a resource exchange instruction to a card management system according to the order information fed back by the convergence management system and the read e-card. At this time, the user is required to attach the e-card to a reading part on the terminal to read information of the card. The e-card herein does not need to be bound to the user ID currently logged on to the terminal, and any e-card is suitable.

It should be noted that, when sending the resource exchange instruction to the card management system, the terminal at least needs to carry the order number and the values of exchange resources to be transferred in the order in the resource exchange instruction.

Step 512. The card management system, according to the resource exchange instruction, transfers an exchange resource in a first resource account corresponding to the e-card to a second resource account corresponding to the order management system, and sends a resource transfer result to the order management system.

The resource transfer result usually carries: an order number, an ID indicating whether the transfer is successful, and the value of the transferred exchange resource of the order.

It should be noted that, the card management system does not directly transfer the exchange resource from the exchange resource in the first resource account corresponding to the e-card to a third resource account corresponding to the item provider device, but transfers the exchange resource from the exchange resource in the first resource account corresponding to the e-card to a second resource account corresponding to the order management system for temporary storage.

Step 513. The order management system sends an item transfer instruction to the convergence management system according to a resource transfer result.

The order management system, after the resource transfer result indicates that the exchange resource has been successfully transferred from the exchange resource in the first resource account corresponding to the e-card to the second resource account corresponding to the order management system, stores the resource transfer result based on the order number, and sends an item transfer instruction to the convergence management system. The item transfer instruction generally includes: a user ID, an item provider ID, a target item ID and the number of the target item.

Correspondingly, the convergence management system receives the item transfer instruction.

Step 514. The convergence management system checks whether an order corresponding to the item transfer instruction is the order generated by the order management system.

In order to ensure security, the convergence management system needs to check whether an order corresponding to the item transfer instruction is the order generated by the order management system, instead of an order generated by malicious users or hackers.

Step 515. When checking that the order corresponding to the item transfer instruction is the order generated by the order management system, the convergence management system forwards the item transfer instruction to the item provider device.

The convergence management system forwards the item transfer instruction to the item provider device according to the item provider ID in the item transfer instruction.

Correspondingly, the item provider device receives the item transfer instruction. After receiving the item transfer instruction, the item provider device transfers a virtual item or real item from an item provider to the user.

Step 516. The item provider device sends an item transfer result to the convergence management system.

The item transfer result generally includes: an order number and an ID indicating whether the transfer is successful.

Step 517. The convergence management system forwards the item transfer result to the order management system.

Step 518. After receiving the item transfer result, the order management system transfers the exchange resource from the second resource account to a third resource account corresponding to the item provider device according to the item transfer result.

After the received item transfer result indicates that the item transfer has succeeded, the order management system transfers the exchange resource from the second resource account to a third resource account corresponding to the item provider device.

Compared with the embodiment in FIG. 3A, this embodiment, by transiting, by a convergence management system, signaling related to the order process and the item transfer process, achieves compatibility with other systems, and the convergence management system can subsequently complete relevant statistical work related to the order process and the item transfer process.

In the embodiment, the step related to the terminal can be separately implemented as an item transfer method at the terminal, the step related to the order management system can be separately implemented as an item transfer method at the order management system, the step related to the card management system can be separately implemented as an item transfer method at the card management system, the step related to the convergence management system can be separately implemented as an item transfer method at the convergence management system, and the step related to the item provider device can be separately implemented as an item transfer method at the item provider device.

Figure 6:
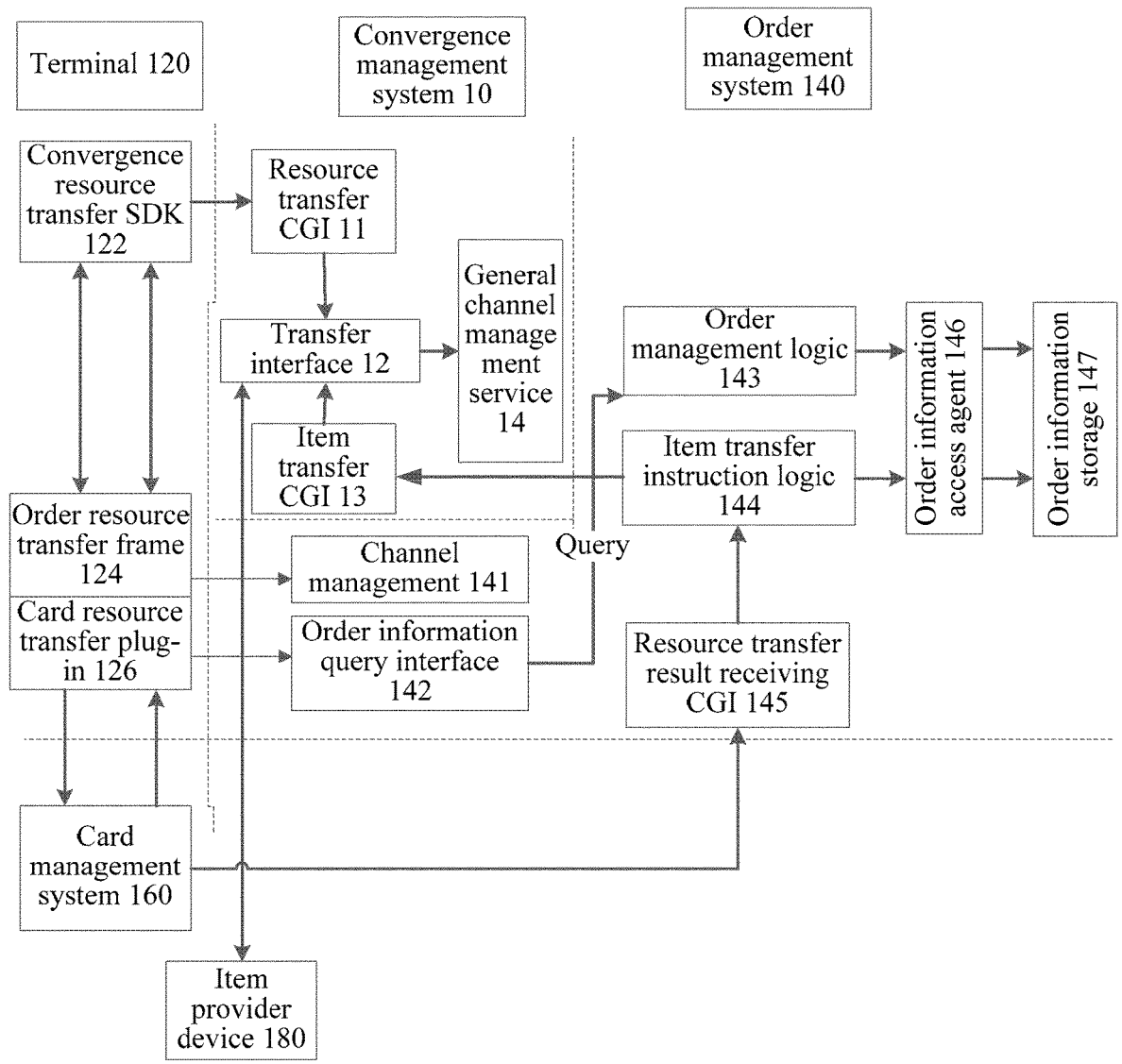
FIG. 6 is a schematic structural diagram of an implementation environment involved in an item transfer method according to a further part of the embodiments of the present invention.

Referring to FIG. 6, FIG. 6 is a schematic structural diagram of an implementation environment involved in an item transfer method according to a further part of the embodiments of the present invention. The implementation environment is further illustration of the implementation environment shown in FIG. 4. The implementation environment includes at least one terminal 120, an order management system 140, a card management system 160, a convergence management system 10 and at least one item provider device 180.

The terminal 120 includes: a convergence resource transfer SoftwareDevelopmentKit (SDK) 122, an order resource transfer frame 124 and a card resource transfer plug-in 126.

The convergence management system 10 includes a resource transfer Common Gateway Interface (CGI) 11, a transfer interface 12, an item transfer CGI 13 and a general channel management service 14.

The order management system 140 includes: channel management 141, an order information query interface 142, order management logic 143, item transfer instruction logic 144, a resource transfer result receiving CGI 145, an order information access agent 146 and order information storage 147.

In a specific embodiment, the item transfer method is applied to the implementation environment shown in FIG. 6. The item transfer method includes:

Step 1. A terminal receives an acquisition signal of a target item.

The terminal 120 displays an acquisition page of the target item to a user, and then receives the user's acquisition signal for the target item in the acquisition page. The acquisition page of the target item may be previously provided in a client of the terminal by an item provider device.

Step 2. The terminal sends a transfer channel query instruction to an order management system.

When the user needs to acquire the target item, the terminal 120 calls the convergence resource transfer SDK 122 to generate a transfer channel query instruction, and the convergence resource transfer SDK 122 forwards the transfer channel query instruction to the channel management 141 in the order management system 140 through the order resource transfer frame 124. The transfer channel refers to a channel through which an exchange resource is transferred, such as a bus card, a metrocard, a campus card and a one-card. Specifically, the step may include the following sub-steps:

1). The convergence resource transfer SDK 122 in the terminal 120 acquires all or some information in a service type corresponding to the target item, a current geographic position and hardware support capability of the terminal.

The terminal can acquire the current geographic position through LBSs. The terminal can acquire its own hardware support capability by reading hardware information or terminal information, and the hardware support capability mainly includes: whether the NFC technology is supported, whether the Bluetooth technology is supported, whether the WIFI technology is supported, and whether the infrared technology is supported. That is, the hardware support capability refers to the terminal's support capability for reading an external e-card through a non-contact reading technology.

2). The convergence resource transfer SDK 122 in the terminal 120 carries the acquired information in the transfer channel query instruction and forwards the transfer channel query instruction to the channel management 141 in the order management system through the order resource transfer frame 124.

Correspondingly, the channel management 141 in the order management system 140 receives the transfer channel query instruction sent by the terminal 120, and the transfer channel query instruction carries the service type, the current geographic position and/or the hardware support capability of the terminal.

Step 3. The channel management in the order management system feeds back a transfer channel list to the terminal according to the transfer channel query instruction, the transfer channel list including at least one resource transfer channel supported by the terminal.

When the transfer channel query instruction carries the service type corresponding to the target item, the current geographic position of the terminal 120 and/or the hardware support capability of the terminal 120, the channel management 141 in the order management system 140 determines a resource transfer channel supported by the terminal 120 according to the information carried in the transfer channel query instruction.

That is, by taking that the transfer channel query instruction carries the service type corresponding to the target item, the current geographic position of the terminal and the hardware support capability of the terminal at the same time as an example, The channel management 141 in the order management system 140 determines a resource transfer channel supported by the service type according to the service type corresponding to the target item; for example, an A service type supports use of an RFID card transfer channel, and a B service type does not support use of the RFID card transfer channel.

The channel management 141 in the order management system 140 determines a resource transfer channel supported by the current geographic position according to the current geographic position of the terminal 120; for example, Beijing area supports use of an XX bus card transfer channel but does not support a Shanghai metrocard transfer channel; while Shanghai area supports the Shanghai metrocard transfer channel but does not support the XX bus card transfer channel.

The channel management 141 in the order management system 140 determines a resource transfer channel supported by the hardware support capability of the terminal 120 according to the hardware support capability of the terminal 120; for example, a terminal of Model A supports an NFC technology, while a terminal of Model B does not support the NFC technology.

The channel management 141 in the order management system 140 performs an intersection operation on the resource transfer channels respectively determined according to the three kinds of information, to obtain a transfer channel list supported by the terminal 120, the transfer channel list including at least one resource transfer channel supported by the terminal.

Correspondingly, the terminal 120 receives the transfer channel list fed back by the order management system.

Step 4. The terminal displays the transfer channel list.

The terminal 120 can display the transfer channel list in a list form in a user interaction interface of the client.

Step 5. The terminal receives a selection signal indicating selection of an e-card transfer channel in the transfer channel list.

The user can select a transfer channel used this time in the transfer channel list displayed by the terminal 120, for example, an e-card transfer channel. The terminal 120 receives a selection signal indicating selection of the e-card transfer channel in the transfer channel list, and the terminal regards the selection signal as an order signal.

Step 6. The convergence resource transfer SDK in the terminal sends an order instruction of the target item to the convergence management system.

After receiving the user's selection signal indicating selection of an e-card transfer channel in the transfer channel list, the terminal 120 sends an order instruction of the target item to the convergence management system 140 through the convergence resource transfer SDK 122. The order instruction at least carries: a user ID, a target provider ID, a target item ID, the number of the target item, a resource value corresponding to a single target item or total resource values corresponding to a plurality of target items.

The terminal 120 may acquire the user ID from a login state of the client. The terminal 120 may also acquire an ID input or designated by the user as the user ID. The terminal 120 may also acquire the target provider ID, the target item ID, the number of the target item, and the unit price or the total price of the target item from an acquisition page of the target item.

Step 7. The convergence management system forwards the order instruction of the target item to an order management system.

After receiving the order instruction sent by the terminal 120, the resource transfer CGI 11 in the convergence management system 10 forwards the order instruction of the target item to the transfer interface 12, the transfer interface 12 forwards the order instruction of the target item to the general channel management service 14, and the general channel management service 14 forwards the order instruction of the target item to the order management logic 143 in the order management system 140.

Step 8. After receiving the order instruction, the order management logic in the order management system generates an order of the target item, and feeds back order information of the order to the convergence management system.

After receiving the order instruction, the order management logic 143 in the order management system 140 generates an order of the target item. The generated order includes an order number, and then the order management logic 143 stores order information of the order to the order information storage 147 through the order information access agent 146, and at least feeds back the order information of the order to the general channel management service 14 in the convergence management system 10.

The order information herein at least needs to include: an order number and values of exchange resources to be transferred in the order. It should be noted that, the order number of the same order may be only one or may also be two. When the order number of the same order is two, one order number is used for identifying the order between the convergence management system and the order management system; the other order number is used for identifying the order between the order management system and the card management system. However, in order to simplify the description, this embodiment is illustrated only by taking that the order number of the same order is one as an example, and the situation where the order number of the same order is two is the content that can be easily thought of by a person skilled in the art based on this embodiment, which is not repeated herein.

Step 9. The convergence management system feeds back the order information to the terminal.

After receiving the order information, the general channel management service 14 in the convergence management system sends the order information to the transfer interface 12, the transfer interface 12 sends the order information to the resource transfer CGI 13, and the resource transfer CGI 13 sends the order information to the convergence resource transfer SDK 122 in the terminal 120.

Step 10. After acquiring the order information, the terminal reads an e-card through a non-contact reading technology.

The non-contact reading technology includes any one of a NFC technology, a WIFI technology, a Bluetooth technology and an infrared technology. The e-card includes RFID cards, NFC cards, non-contact IC cards (Integrated Circuit Cards) and iBeacon produced by Apple. This embodiment is mainly illustrated by taking that the non-contact reading technology is a NFC technology and the e-card is an RFID card as an example.

After the terminal acquires the order information, the user is required to attach the e-card to a reading part on the terminal to read information of the card. The e-card herein does not need to be bound to the user ID currently logged on to the terminal, and any e-card is suitable.

Step 11. The terminal sends a resource exchange instruction to a card management system according to the order information and the read e-card.

The convergence resource transfer SDK 122 in the terminal 120 sends the order information to the card resource transfer plug-in 126, and the card resource transfer plug-in 126 sends a resource exchange instruction to a card management system according to the order information fed back by the convergence management system and the read e-card. At this time, the user is required to attach the e-card to a reading part on the terminal 120 to read information of the card. The e-card herein does not need to be bound to the user ID currently logged on to the terminal 120, and any e-card is suitable.

It should be noted that, when sending the resource exchange instruction to the card management system 160, the card resource transfer plug-in 126 in the terminal 120 at least needs to carry the order number and the values of exchange resources to be transferred in the order in the resource exchange instruction.

Step 12. The card management system, according to the resource exchange instruction, transfers an exchange resource in a first resource account corresponding to the e-card to a second resource account corresponding to the order management system, and sends a resource transfer result to the order management system.

The resource transfer result usually carries: an order number, an ID indicating whether the transfer is successful, and the value of the transferred exchange resource of the order.

It should be noted that, the card management system 160 does not directly transfer the exchange resource from the exchange resource in the first resource account corresponding to the e-card to a third resource account corresponding to the item provider device, but transfers the exchange resource from the exchange resource in the first resource account corresponding to the e-card to a second resource account corresponding to the order management system 140 for temporary storage.

The card management system 160 further sends the resource transfer result to the resource transfer result receiving CGI 145 in the order management system 140, and the resource transfer result receiving CGI 145 sends the resource transfer result to the item transfer instruction logic 144.

Step 13. The order management system sends an item transfer instruction to the convergence management system according to a resource transfer result.

After checking the resource transfer result, the item transfer instruction logic 144 in the order management system 140 stores the resource transfer result to the order information storage 147. That is, after the resource transfer result indicates that the exchange resource has been successfully transferred from the exchange resource in the first resource account corresponding to the e-card to the second resource account corresponding to the order management system 140, the item transfer instruction logic 144 stores the resource transfer result based on the order number, and sends an item transfer instruction to the item transfer CGI 13 in the convergence management system 10. The item transfer instruction generally includes: a user ID, an item provider ID, a target item ID and the number of the target item.

Correspondingly, the item transfer CGI 13 in the convergence management system 10 receives the item transfer instruction.

Step 14. The convergence management system checks whether an order corresponding to the item transfer instruction is the order generated by the order management system.

The item transfer CGI 13 in the convergence management system 10 forwards the item transfer instruction to the general channel management service 14, and in order to ensure security, the general channel management service 14 in the convergence management system 10 needs to check whether an order corresponding to the item transfer instruction is the order generated by the order management system 140, instead of an order generated by malicious users or hackers.

Step 15. When checking that the order corresponding to the item transfer instruction is the order generated by the order management system, the convergence management system forwards the item transfer instruction to the item provider device.

When checking that the order corresponding to the item transfer instruction is the order generated by the order management system, the general channel management service 14 in the convergence management system 10 forwards the item transfer instruction to the transfer interface 12, the transfer interface 12 forwards the item transfer instruction to item provider device 180 according to the item provider ID in the item transfer instruction.

Correspondingly, the item provider device 180 receives the item transfer instruction. After receiving the item transfer instruction, the item provider device 180 transfers a virtual item or real item from an item provider to the user.

Step 16. The item provider device sends an item transfer result to the convergence management system.

The item transfer result generally includes: an order number and an ID indicating whether the transfer is successful.

The item provider device 180 sends an item transfer result to the transfer interface 12 in the convergence management system 10.

Step 17. The convergence management system forwards the item transfer result to the order management system.

The transfer interface 12 in the convergence management system 10 sends the item transfer result to the general channel management service 14, the general channel management service 14 sends the item transfer result to the item transfer CGI 13, the item transfer CGI 13 sends the item transfer result to the item transfer instruction logic 144 in the order management system 140.

Step 18. After receiving the item transfer result, the order management system transfers the exchange resource from the second resource account to a third resource account corresponding to the item provider device according to the item transfer result.

After the received item transfer result indicates that the item transfer has succeeded, the item transfer instruction logic 144 in the order management system 140 transfers the exchange resource from the second resource account to a third resource account corresponding to the item provider device, and stores the item transfer result in the order information storage 147.

The following are apparatus embodiments of the present invention; reference can be made the corresponding method embodiments for details not fully described in the apparatus embodiments.

Figure 7:
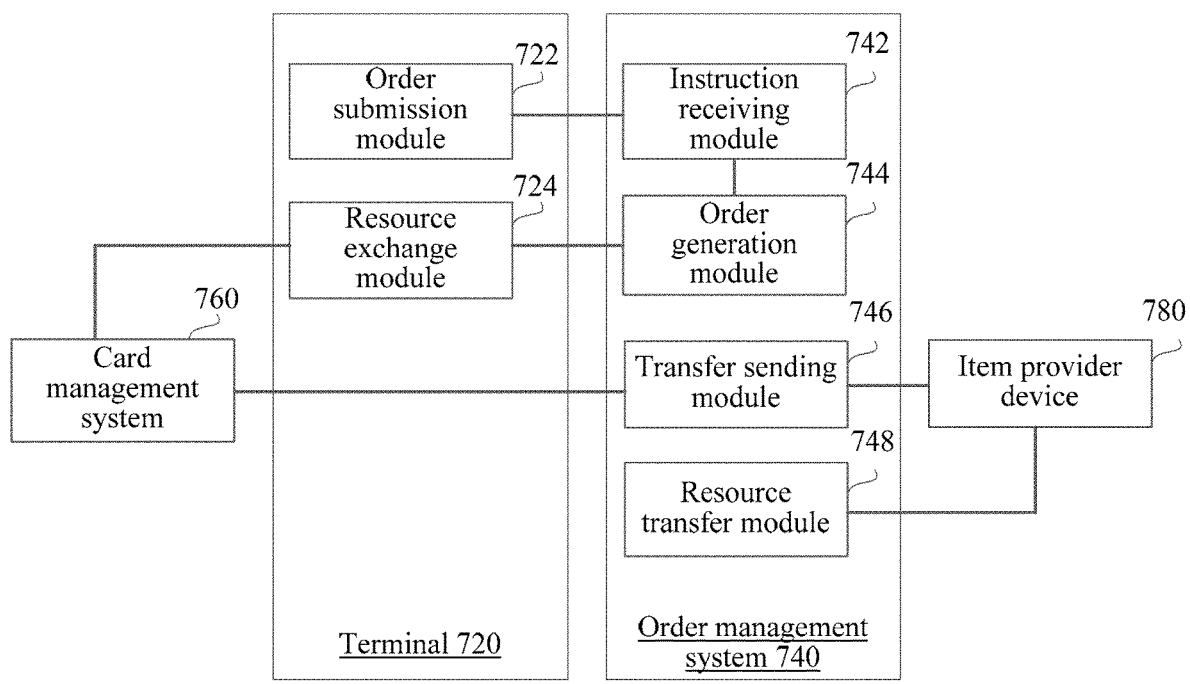
FIG. 7 is a structural block diagram of an item transfer system according to one embodiment of the present invention.

Referring to FIG. 7, FIG. 7 is a structural block diagram of an item transfer system according to one embodiment of the present invention. The item transfer system includes: a terminal 720, an order management system 740, a card management system 760 and an item provider device 780, the terminal 720 communicates with the order management system 740 and the card management system 760 through a wired network or wireless network, and the order management system 740 communicates with the card management system 760 and the item provider device 780 through a wired network or wireless network.

The terminal 720 includes an item transfer apparatus, and the item transfer apparatus can be implemented as all or a part of the terminal 720 through software, hardware or a combination thereof. The item transfer apparatus includes:

an order submission module 722, configured to send an order instruction of a target item to an order management system, so that the order management system, after receiving the order instruction, generates an order of the target item, and feeds back order information of the order; and a resource exchange module 724, configured to send a resource exchange instruction to a card management system according to the order information and a read e-card, so that the card management system, according to the resource exchange instruction, transfers an exchange resource in a first resource account corresponding to the e-card to a second resource account corresponding to the order management system, and sends a resource transfer result to the order management system; the order management system sends an item transfer instruction to an item provider device according to the resource transfer result; and the order management system, after receiving an item transfer result fed back by the item provider device, transfers the exchange resource from the second resource account to a third resource account corresponding to the item provider device according to the item transfer result.

The order management system 740 includes an item transfer apparatus, and the item transfer apparatus can be implemented as all or a part of the order management system 740 through software, hardware or a combination thereof. The item transfer apparatus includes:

an instruction receiving module 742, configured to receive an order instruction of a target item sent by a terminal;

an order generation module 744, configured to generate an order of the target item, and feed back order information of the order to the terminal; so that the terminal sends a resource exchange instruction to a card management system according to the order information and a read e-card; and the card management system, according to the resource exchange instruction, transfers an exchange resource in a first resource account corresponding to the e-card to a second resource account corresponding to an order management system, and sends a resource transfer result to the order management system;

a transfer sending module 746, configured to send an item transfer instruction to an item provider device according to the resource transfer result; and a resource transfer module 748, configured to, after receiving an item transfer result fed back by the item provider device, transfer the exchange resource from the second resource account to a third resource account corresponding to the item provider device.

To sum up, the item transfer apparatus in this embodiment, by sending, by a terminal, an order instruction of a target item to an order management system, feeding back, by the order management system, order information of an order to the terminal, sending, by the terminal, a resource exchange instruction to a card management system according to the order information and a read e-card, completing, by the card management system, transfer of the exchange resource, sending, by the order management system, an item transfer instruction to an item provider device according to a resource transfer result, and completing, by the item provider device, transfer of the target item, solves the problem that the current item transfer method not only needs to bind an e-card to a mobile phone but also has cumbersome operations; thereby achieving an effect that a user can acquire a target item through the e-card after directly making an order at a terminal without pre-binding or scanning a two-dimensional code or other additional operations.

Figure 8:
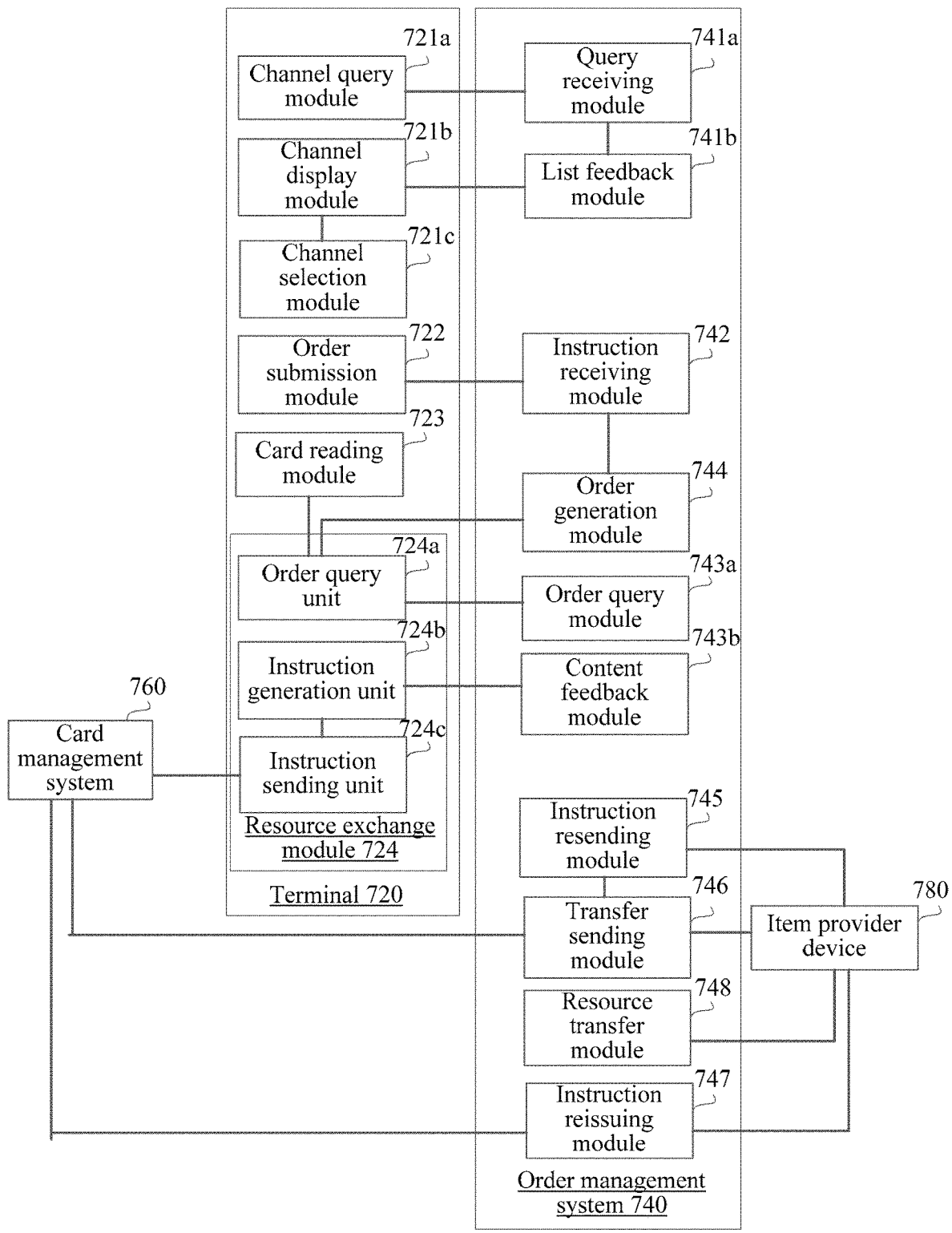
FIG. 8 is a structural block diagram of an item transfer system according to another embodiment of the present invention.

Referring to FIG. 8, FIG. 8 is a structural block diagram of an item transfer system according to another embodiment of the present invention. The item transfer system includes:

a terminal 720, an order management system 740, a card management system 760 and an item provider device 780, the terminal 720 communicates with the order management system 740 and the card management system 760 through a wired network or wireless network, and the order management system 740 communicates with the card management system 760 and the item provider device 780 through a wired network or wireless network.

The terminal 720 includes an item transfer apparatus, and the item transfer apparatus can be implemented as all or a part of the terminal 720 through software, hardware or a combination thereof. The item transfer apparatus includes:

an order submission module 722, configured to send an order instruction of a target item to an order management system, so that the order management system, after receiving the order instruction, generates an order of the target item, and feeds back order information of the order; and a resource exchange module 724, configured to send a resource exchange instruction to a card management system according to the order information and a read e-card, so that the card management system, according to the resource exchange instruction, transfers an exchange resource in a first resource account corresponding to the e-card to a second resource account corresponding to the order management system, and sends a resource transfer result to the order management system; the order management system sends an item transfer instruction to an item provider device according to the resource transfer result; and the order management system, after receiving an item transfer result fed back by the item provider device, transfers the exchange resource from the second resource account to a third resource account corresponding to the item provider device according to the item transfer result.

Optionally, the apparatus further includes: a channel query module 721a, a channel display module 721b and a channel selection module 721c;

wherein the channel query module 721a is configured to send a transfer channel query instruction to the order management system, so that the order management system feeds back a transfer channel list according to the transfer channel query instruction, the transfer channel list including at least one resource transfer channel supported by the terminal;

the channel display module 721b is configured to display the transfer channel list; and the channel selection module 721c is configured to receive a selection signal indicating selection of an e-card transfer channel in the transfer channel list.

Optionally, the channel query module 721a includes: an information acquisition unit and a channel query unit;

the information acquisition unit is configured to acquire all or some information in a service type corresponding to the target item, a current geographic position and hardware support capability of the terminal; and the channel query unit is configured to carry the acquired information in the transfer channel query instruction to be sent to the order management system; so that the order management system determines a resource transfer channel supported by the terminal according to the information carried in the transfer channel query instruction.

Optionally, the resource exchange module 724 includes: an order query unit 724a, an instruction generation unit 724b and an instruction sending unit 724c;

the order query unit 724a is configured to, when the order information received only includes an order number, send an order query instruction to the order management system according to the order number, the order query instruction being used for querying for order information of an order of the target item, and the order information at least including values of exchange resources corresponding to the target item;

the instruction generation unit 724b is configured to generate the resource exchange instruction according to the order information and information of the read e-card; and the instruction sending unit 724c is configured to send the resource exchange instruction to the card management system.

Optionally, the apparatus further includes:

a card reading module 723, configured to, after the order information is acquired, read the e-card through a non-contact reading technology, the non-contact reading technology including any one of a Near Field Communication (NFC) technology, a Wireless Fidelity (WIFI) technology, Bluetooth technology and an infrared technology.

The order management system 740 includes an item transfer apparatus, and the item transfer apparatus can be implemented as all or a part of the order management system 740 through software, hardware or a combination thereof. The item transfer apparatus includes:

an instruction receiving module 742, configured to receive an order instruction of a target item sent by a terminal;

an order generation module 744, configured to generate an order of the target item, and feed back order information of the order to the terminal; so that the terminal sends a resource exchange instruction to a card management system according to the order information and a read e-card; and the card management system, according to the resource exchange instruction, transfers an exchange resource in a first resource account corresponding to the e-card to a second resource account corresponding to an order management system, and sends a resource transfer result to the order management system;

a transfer sending module 746, configured to send an item transfer instruction to an item provider device according to the resource transfer result; and a resource transfer module 748, configured to, after receiving an item transfer result fed back by the item provider device, transfer the exchange resource from the second resource account to a third resource account corresponding to the item provider device.

Optionally, the apparatus further includes:

a query receiving module 741a, configured to receive a transfer channel query instruction sent by the terminal; and a list feedback module 741b, configured to feed back a transfer channel list to the terminal according to the transfer channel query instruction, the transfer channel list including at least one resource transfer channel supported by the terminal; so that the terminal displays the transfer channel list and receives a selection signal indicating selection of an e-card transfer channel in the transfer channel list.

Optionally, the list feedback module 741b is configured to, when the transfer channel query instruction carries all or some information in a service type corresponding to the target item, a current geographic position of the terminal and hardware support capability of the terminal, determine a resource transfer channel supported by the terminal according to the information carried in the transfer channel query instruction.

Optionally, the apparatus further includes:

an order query module 743a, configured to receive, when the order information fed back by the terminal only includes an order number, an order query instruction sent according to the order number, the order query instruction being used for querying for order information of an order of the target item, and the order information at least including values of exchange resources corresponding to the target item; and a content feedback module 743b, configured to feed back the order information of the order of the target item to the terminal, so that the terminal generates the resource exchange instruction according to the order information and information of the read e-card, and sends the resource exchange instruction to the card management system.

Optionally, the apparatus further includes:

an instruction resending module 745, configured to, if an item transfer result corresponding to the order is not received within an appointed time period, resend the item transfer instruction to the item provider device with respect to the order.

Optionally, the apparatus further includes:

an instruction reissuing module 747, configured to perform order check with the item provider device every other predetermined time interval, and when checking that transfer of the exchange resource has been completed but the resource transfer result has not been received for the order, reissue the item transfer instruction to the item provider device with respect to the order.

To sum up, the item transfer apparatus in this embodiment, by sending, by a terminal, an order instruction of a target item to an order management system, feeding back, by the order management system, order information of an order to the terminal, sending, by the terminal, a resource exchange instruction to a card management system according to the order information and a read e-card, completing, by the card management system, transfer of the exchange resource, sending, by the order management system, an item transfer instruction to an item provider device according to a resource transfer result, and completing, by the item provider device, transfer of the target item, solves the problem that the current item transfer method not only needs to bind an e-card to a mobile phone but also has cumbersome operations; thereby achieving an effect that a user can acquire a target item through the e-card after directly making an order at a terminal without pre-binding or scanning a two-dimensional code or other additional operations.

In other words, in the item transfer method provided in the prior art, the user can complete acquisition of a target item only by going through a plurality of steps such as binding, scanning a two-dimensional code, selecting a transfer channel, verifying whether an e-card is a bound card, and transferring an exchange resource by using the bound e-card; however, it can be known according to FIG. 3B and FIG. 3C that the item transfer apparatus provided in FIG. 8 can complete acquisition of the target item only if the user directly uses the e-card to transfer the exchange resource after selecting a transfer channel, and the whole process can be completed only if the user "selects a target item, selects a transfer channel, and transfers an exchange resource by using the e-card", which can be smoothly completed even by users such as the elderly or children and does not require a too high learning cost.

Figure 9:
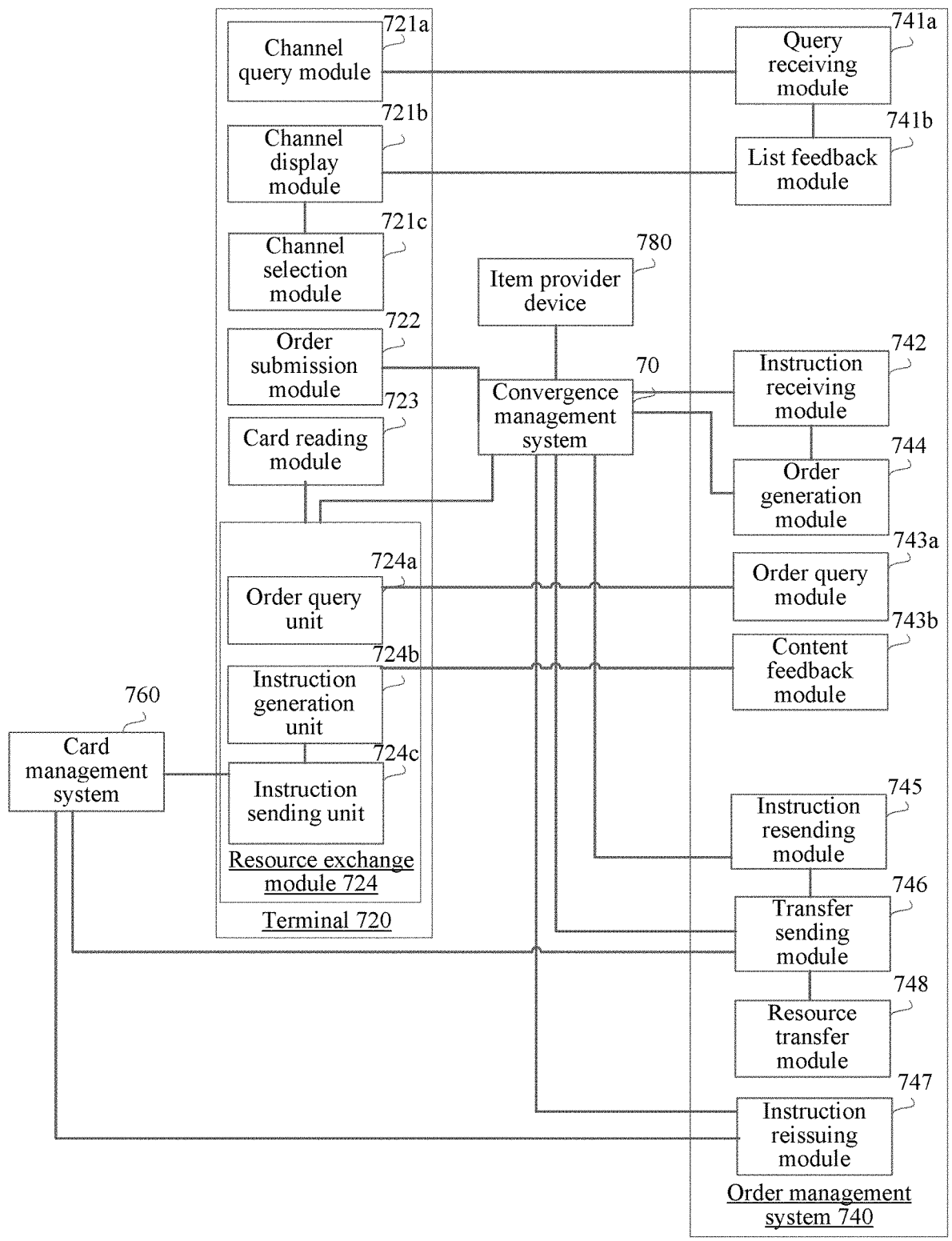
FIG. 9 is a structural block diagram of an item transfer system according to a further embodiment of the present invention.

Referring to FIG. 9, FIG. 9 is a structural block diagram of an item transfer system according to a further embodiment of the present invention. The item transfer system includes: a terminal 720, a convergence management system 70, an order management system 740, a card management system 760 and an item provider device 780. The terminal 720 communicates with the convergence management system 70 and the card management system 760 through a wired network or wireless network, and the order management system 740 respectively communicates with the convergence management system 70, the terminal 720 and the card management system 760 through the wired network or wireless network; and the item provider device 780 respectively communicates with the convergence management system 70 and the terminal 720 through the wired network or wireless network.

The terminal 720 includes an item transfer apparatus, and the item transfer apparatus can be implemented as all or a part of the terminal 720 through software, hardware or a combination thereof. The item transfer apparatus includes:

an order submission module 722, configured to, when the local end and the order management system 740 are connected through a convergence management system 70, send the order instruction to the convergence management system 70, so that the convergence management system 70 forwards the order instruction to the order management system 740, and so that the order management system 740, after receiving the order instruction, generates an order of the target item, and feeds back order information of the order; and a resource exchange module 724, configured to send a resource exchange instruction to a card management system according to the order information and a read e-card, so that the card management system, according to the resource exchange instruction, transfers an exchange resource in a first resource account corresponding to the e-card to a second resource account corresponding to the order management system, and sends a resource transfer result to the order management system; the order management system sending an item transfer instruction to an item provider device according to the resource transfer result; and the order management system, after receiving an item transfer result fed back by the item provider device, transferring the exchange resource from the second resource account to a third resource account corresponding to the item provider device according to the item transfer result.

Optionally, the apparatus further includes: a channel query module 721a, a channel display module 721b and a channel selection module 721c;

wherein the channel query module 721a is configured to send a transfer channel query instruction to the order management system, so that the order management system feeds back a transfer channel list according to the transfer channel query instruction, the transfer channel list including at least one resource transfer channel supported by the terminal;

the channel display module 721b is configured to display the transfer channel list; and the channel selection module 721c is configured to receive a selection signal indicating selection of an e-card transfer channel in the transfer channel list.

Optionally, the channel query module 721a includes: an information acquisition unit and a channel query unit;

the information acquisition unit is configured to acquire all or some information in a service type corresponding to the target item, a current geographic position and hardware support capability of the terminal; and the channel query unit is configured to carry the acquired information in the transfer channel query instruction to be sent to the order management system; so that the order management system determines a resource transfer channel supported by the terminal according to the information carried in the transfer channel query instruction.

Optionally, the resource exchange module 724 includes: an order query unit 724a, an instruction generation unit 724b and an instruction sending unit 724c;

the order query unit 724a is configured to, when the order information received only includes an order number, send an order query instruction to the order management system according to the order number, the order query instruction being used for querying for order information of an order of the target item, and the order information at least including values of exchange resources corresponding to the target item;

the instruction generation unit 724b is configured to generate the resource exchange instruction according to the order information and information of the read e-card; and the instruction sending unit 724c is configured to send the resource exchange instruction to the card management system.

Optionally, the apparatus further includes:

a card reading module 723, configured to, after the order information is acquired, read the e-card through a non-contact reading technology, the non-contact reading technology including any one of a Near Field Communication (NFC) technology, a Wireless Fidelity (WIFI) technology, Bluetooth technology and an infrared technology.

The order management system 740 includes an item transfer apparatus, and the item transfer apparatus can be implemented as all or a part of the order management system 740 through software, hardware or a combination thereof. The item transfer apparatus includes:

an instruction receiving module 742, configured to receive an order instruction of a target item sent by a terminal;

an order generation module 744, configured to generate an order of the target item, and feed back order information of the order to the terminal; so that the terminal sends a resource exchange instruction to a card management system according to the order information and a read e-card; and the card management system, according to the resource exchange instruction, transfers an exchange resource in a first resource account corresponding to the e-card to a second resource account corresponding to an order management system, and sends a resource transfer result to the order management system;

a transfer sending module 746, configured to, when the local end and the item provider device 780 are connected through a convergence management system 70, send an item transfer instruction to the convergence management system 70 according to the resource transfer result, so that the convergence management system 70 forwards the item transfer instruction to the item provider device 780; and a resource transfer module 748, configured to, after receiving an item transfer result fed back by the item provider device, transfer the exchange resource from the second resource account to a third resource account corresponding to the item provider device.

Optionally, the apparatus further includes:

a query receiving module 741a, configured to receive a transfer channel query instruction sent by the terminal; and a list feedback module 741b, configured to feed back a transfer channel list to the terminal according to the transfer channel query instruction, the transfer channel list including at least one resource transfer channel supported by the terminal; so that the terminal displays the transfer channel list and receives a selection signal indicating selection of an e-card transfer channel in the transfer channel list.

Optionally, the list feedback module 741b is configured to, when the transfer channel query instruction carries all or some information in a service type corresponding to the target item, a current geographic position of the terminal and hardware support capability of the terminal, determine a resource transfer channel supported by the terminal according to the information carried in the transfer channel query instruction.

Optionally, the apparatus further includes:

an order query module 743a, configured to receive, when the order information fed back by the terminal only includes an order number, an order query instruction sent according to the order number, the order query instruction being used for querying for order information of an order of the target item, and the order information at least including values of exchange resources corresponding to the target item; and a content feedback module 743b, configured to feed back the order information of the order of the target item to the terminal, so that the terminal generates the resource exchange instruction according to the order information and information of the read e-card, and sends the resource exchange instruction to the card management system.

Optionally, the apparatus further includes:

an instruction resending module 745, configured to, if an item transfer result corresponding to the order is not received within an appointed time period, resend the item transfer instruction to the item provider device with respect to the order.

Optionally, the apparatus further includes:

an instruction reissuing module 747, configured to perform order check with the item provider device every other predetermined time interval, and when checking that transfer of the exchange resource has been completed but the resource transfer result has not been received for the order, reissue the item transfer instruction to the item provider device with respect to the order.

To sum up, the item transfer apparatus in this embodiment, by sending, by a terminal, an order instruction of a target item to an order management system, feeding back, by the order management system, order information of an order to the terminal, sending, by the terminal, a resource exchange instruction to a card management system according to the order information and a read e-card, completing, by the card management system, transfer of the exchange resource, sending, by the order management system, an item transfer instruction to an item provider device according to a resource transfer result, and completing, by the item provider device, transfer of the target item, solves the problem that the current item transfer method not only needs to bind an e-card to a mobile phone but also has cumbersome operations; thereby achieving an effect that a user can acquire a target item through the e-card after directly making an order at a terminal without pre-binding or scanning a two-dimensional code or other additional operations.

In other words, in the item transfer method provided in the prior art, the user can complete acquisition of a target item only by going through a plurality of steps such as binding, scanning a two-dimensional code, selecting a transfer channel, verifying whether an e-card is a bound card, and transferring an exchange resource by using the bound e-card; however, it can be known according to FIG. 3B and FIG. 3C that the item transfer apparatus provided in FIG. 9 can complete acquisition of the target item only if the user directly uses the e-card to transfer the exchange resource after selecting a transfer channel, and the whole process can be completed only if the user "selects a target item, selects a transfer channel, and transfers an exchange resource by using the e-card", which can be smoothly completed even by users such as the elderly or children and does not require a too high learning cost.

This embodiment, by transiting, by a convergence management system, signaling related to the order process and the item transfer process, achieves compatibility with other systems, and the convergence management system can subsequently complete relevant statistical work related to the order process and the item transfer process.

It should be noted that, when the item transfer systems in the embodiments transfers the target item, illustration is given only according to division of functional modules, during actual applications, and the functions can be assigned to and completed by different functional modules as required, that is, an internal structure of a device is divided into different functional modules, to complete all or some of the functions. In addition, the item transfer apparatuses in the embodiments and the item transfer method embodiments belong to the same concept, and reference can be made to the method embodiments for specific implementation process thereof, which is not repeated herein.

Figure 10:
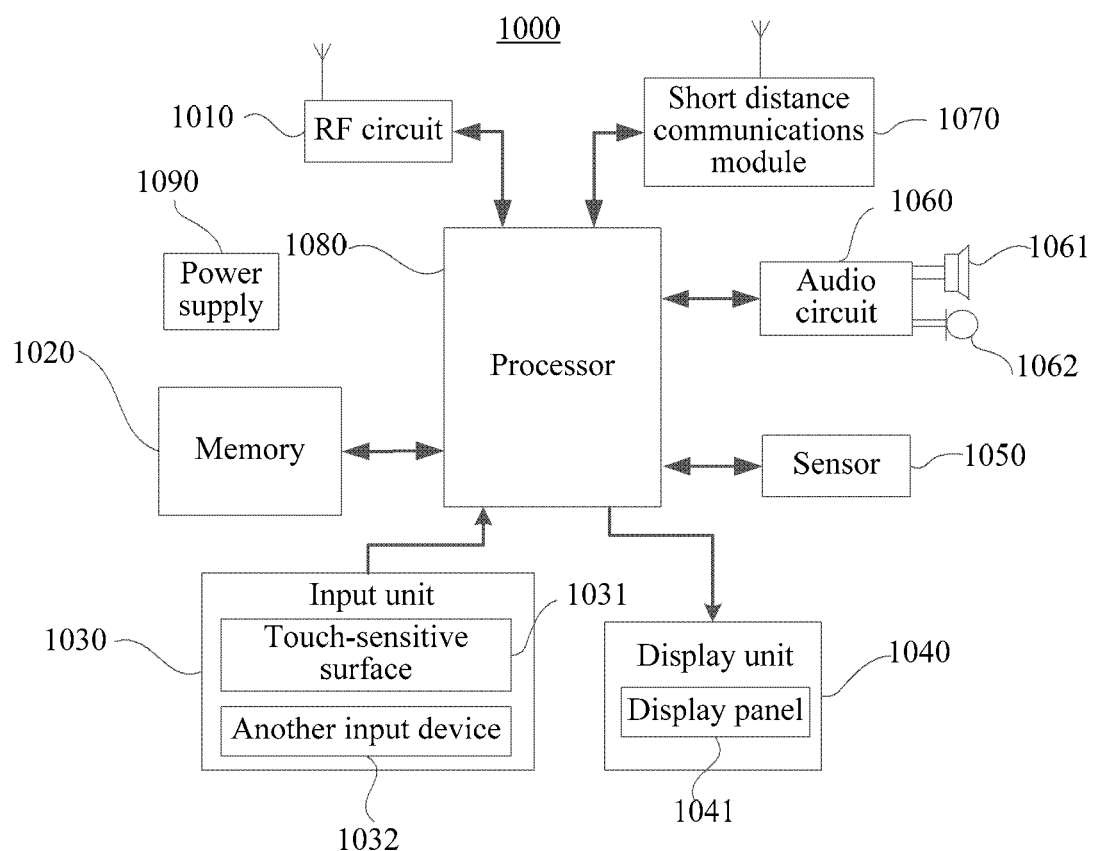
FIG. 10 is a structural block diagram of a terminal according to one embodiment of the present invention.

Referring to FIG. 10, FIG. 10 is a structural block diagram of a terminal according to one embodiment of the present invention. The electronic device can be configured to implement the item transfer methods in the embodiments. Specifically:

The terminal 1000 may include components such as a Radio Frequency (RF) circuit 1010, a memory 1020 including one or more computer readable storage mediums, an input unit 1030, a display unit 1040, a sensor 1050, an audio circuit 1060, a short distance communications module 1070, a processor 1080 including one or more processing cores, and a power supply 1090. A person skilled in the art may understand that the structure of the terminal shown in FIG. 10 does not constitute a limitation to the terminal, and the terminal may include more components or fewer components than those shown in the figure, or some components may be combined, or a different component deployment may be used.

The RF circuit 1010 may be configured to receive and send signals during an information receiving and sending process or a call process. Particularly, the RF circuit 1010 receives downlink information from a base station, then delivers the downlink information to the one or more processors 1080 for processing, and sends related uplink data to the base station. Generally, the RF circuit 1010 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1010 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 1020 may be configured to store a software program and module. The processor 1080 runs the software program and module stored in the memory 1020, to implement various functional applications and data processing. The memory 1020 may mainly include a program storage area and a data storage area. The program storage area may store an operating system, an application program required by at least one function (such as a sound playback function and an image display function), and the like. The data storage area may store data (such as audio data and an address book) created according to use of the terminal 1000, and the like. In addition, the memory 1020 may include a high speed random access memory, and may also include a nonvolatile memory, such as at least one magnetic disk storage device, a flash memory, or another volatile solid-state storage device. Correspondingly, the memory 1020 may further include a memory controller, so as to provide access of the processor 1080 and the input unit 1030 to the memory 1020.

The input unit 1030 may be configured to receive input digit or character information, and generate a keyboard, mouse, joystick, optical, or track ball signal input related to the user setting and function control. Specifically, the input unit 1030 may include a touch-sensitive surface 1031 and another input device 1032. The touch-sensitive surface 1031, which may also be referred to as a touch screen or a touch panel, may collect a touch operation of a user on or near the touch-sensitive surface (such as an operation of a user on or near the touch-sensitive surface 1031 by using any suitable object or accessory, such as a finger or a stylus), and drive a corresponding connection apparatus according to a preset program. Optionally, the touch-sensitive surface 1031 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1080. Moreover, the touch controller can receive and execute a command sent from the processor 1080. In addition, the touch-sensitive surface 1031 may be may be a resistive, capacitive, infrared, or surface sound wave type touch-sensitive surface. In addition to the touch-sensitive surface 1031, the input unit 1030 may further include the another input device 1032. Specifically, the another input device 1032 may include, but is not limited to, one or more of a physical keyboard, a functional key (such as a volume control key or a switch key), a track ball, a mouse, and a joystick.

The display unit 1040 may be configured to display information input by the user or information provided for the user, and various graphical user interfaces of the terminal 1000. The graphical user interfaces may be formed by a graph, a text, an icon, a video, or any combination thereof. The display unit 1040 may include a display panel 1041. Optionally, the display panel 1041 may be configured by using a liquid crystal display (LCD), an organic light-emitting diode (OLED), or the like. Further, the touch-sensitive surface 1031 may cover the display panel 1041. After detecting a touch operation on or near the touch-sensitive surface 1031, the touch-sensitive surface 1031 transfers the touch operation to the processor 1080, so as to determine the type of the touch event. Then, the processor 1080 provides a corresponding visual output on the display panel 1041 according to the type of the touch event. Although, in FIG. 10, the touch-sensitive surface 1031 and the display panel 1041 are used as two separate parts to implement input and output functions, in some embodiments, the touch-sensitive surface 1031 and the display panel 1041 may be integrated to implement the input and output functions.

The terminal 1000 may further include at least one sensor 1050, such as an optical sensor, a motion sensor, and other sensors. Specifically, the optical sensor may include an ambient light sensor and a proximity sensor. The ambient light sensor can adjust luminance of the display panel 1041 according to brightness of the ambient light. The proximity sensor may switch off the display panel 1041 and/or backlight when the terminal 1000 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1000, are not further described herein.

The audio circuit 1060, a loudspeaker 1061, and a microphone 1062 may provide audio interfaces between the user and the terminal 1000. The audio circuit 1060 may convert received audio data into an electric signal and transmit the electric signal to the loudspeaker 1061. The loudspeaker 1061 converts the electric signal into a sound signal for output. On the other hand, the microphone 1062 converts a collected sound signal into an electric signal. The audio circuit 1060 receives the electric signal and converts the electric signal into audio data, and outputs the audio data to the processor 1080 for processing. Then, the processor 1080 sends the audio data to, for example, another terminal device by using the RF circuit 1010, or outputs the audio data to the memory 1020 for further processing. The audio circuit 1060 may further include an earplug jack, so as to provide communication between a peripheral earphone and the terminal 1000.

The short distance communications module 170 may include a WiFi technology and/or a NFC technology and/or a Bluetooth technology and/or an infrared technology, and the terminal 1000 may help, by using the short distance communications module 170, the user to receive and send e-mails, browse a webpage, access streaming media, and so on, which provides wireless broadband Internet access and short distance communications for the user, for example, configured to read/write an e-card in the embodiments of the present invention.

The processor 1080 is the control center of the terminal 1000, and is connected to various parts of the mobile phone by using various interfaces and lines. By running or executing the software program and/or module stored in the memory 1020, and invoking data stored in the memory 1020, the processor 1080 performs various functions and data processing of the terminal 1000, thereby performing overall monitoring on the mobile phone. Optionally, the processor 1080 may include one or more processing cores. Preferably, the processor 1080 may integrate an application processor and a modem. The application processor mainly processes an operating system, a user interface, an application program, and the like. The modem mainly processes wireless communication. It may be understood that the foregoing modem may also not be integrated into the processor 1080.

The terminal 1000 further includes the power supply 1090 (such as a battery) for supplying power to the components. Preferably, the power supply may be logically connected to the processor 1080 by using a power management system, thereby implementing functions such as charging, discharging and power consumption management by using the power management system. The power supply 1090 may further include one or more of a direct current or alternating current power supply, a re-charging system, a power failure detection circuit, a power supply converter or inverter, a power supply state indicator, and any other components.

Although not shown in the figure, the terminal 1000 may further include a camera, a Bluetooth module, and the like, which are not further described herein. Specifically, in this embodiment, the display unit of the electronic device is a touch screen display, and the electronic device further includes a memory and one or more programs. The one or more programs are stored in the memory and configured to be executed by one or more processors. The one or more programs contain instructions used for implementing the item transfer methods.

Figure 11:
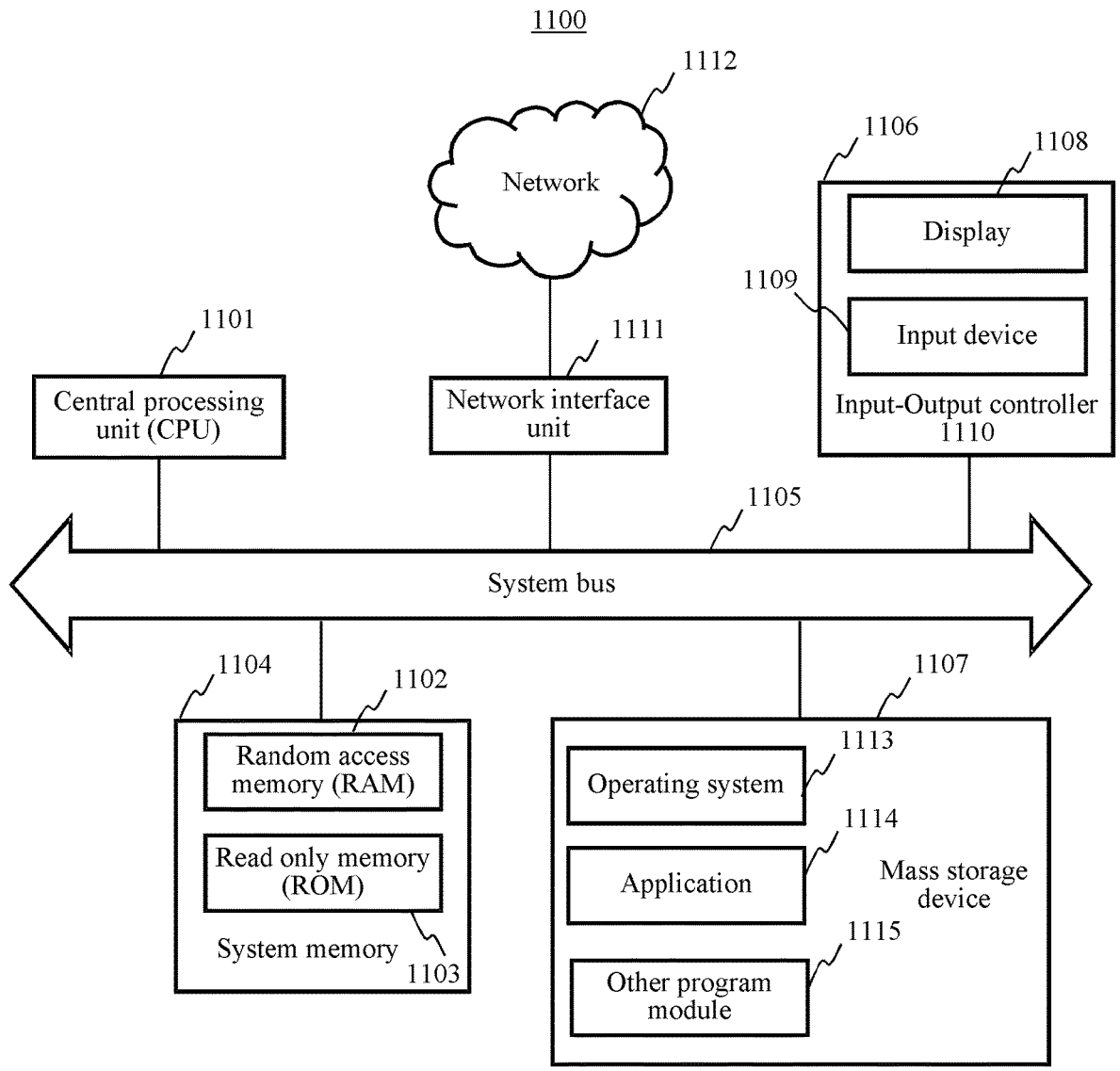
FIG. 11 is a structural block diagram of a server according to one embodiment of the present invention.

Referring to FIG. 11, FIG. 11 is a structural block diagram of a server according to one embodiment of the present invention. One or more servers can make up the order management system, the card management system, the convergence management system or the item provider device in the embodiments of the present invention. The server 1100 includes a central processing unit (CPU) 1101, a system memory 1104 including a random access memory (RAM) 1102 and a read only memory (ROM) 1103, and a system bus 1105 connecting the system memory 1104 and the CPU 1101. The server 1100 further includes a basic input/output (I/O) system 1106 that helps to transmit information between respective devices in a computer, and a mass storage device 1107 configured to store an operating system 1113, an application 1114 and other program modules 1115.

The basic I/O system 1106 includes a display 1108 configured to display information and an input device 1109 such as a mouse or a keyboard for a user to input information. The display 1108 and the input device 1109 are both connected to the CPU 1101 through an input-output controller 1110 connected to the system bus 1105. The basic I/O system 1106 may further include an input-output controller 1110 configured to receive and process input from many other devices such as a keyboard, a mouse and an electronic stylus. Similarly, the input-output controller 1110 also provides output to a display screen, a printer or other types of output devices.

The mass storage device 1107 is connected to the CPU 1101 through a mass storage controller (not shown) connected to the system bus 1105. The mass storage device 1107 and a computer readable medium associated therewith provide nonvolatile storage for the server 1100. In other words, the mass storage device 1107 may include a computer readable medium (not shown) such as a hard disk or a CD-ROM drive.

Without loss of generality, the computer readable medium may include a computer storage medium and a communications medium. The computer storage medium includes volatile, nonvolatile, removable and non-removable mediums implemented by any method or technology for storing information such as computer readable instructions, data structures, program modules or other data. The computer storage medium includes a RAM, a ROM, an EPROM, an EEPROM, a flash memory or other solid-state storage technologies, a CD-ROM, a DVD or other optical storages, a magnetic tape cassette, a magnetic disk storage or other magnetic storage devices. Certainly, a person skilled in the art may know that the computer storage medium is not limited to the above. The system memory 1104 and the mass storage device 1107 may be collectively referred to as a memory.

According to various embodiments of the present invention, the server 1100 may also operate by being connected to a remote computer on a network by using the Internet or other networks. That is, the server 1100 may be connected to a network 1112 by using a network interface unit 1111 on the system bus 1105, or, it may also be connected to other types of networks or remote computer systems (not shown) by using the network interface unit 1111.

The memory also includes one or more programs, the one or more programs are stored in the memory, and the one or more programs contain instructions for performing the item transfer methods in the embodiments of the present invention.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. An item transfer apparatus, comprising a memory and a processor in communication with the memory, wherein the item transfer apparatus is in communication with a terminal, a card management system, and an item provider device, and wherein the memory stores instruction, the instructions when executed by the processor cause the processor to:
   receive, from the terminal, a transfer channel query instruction on a target item, wherein the transfer channel query instruction includes information on a service type corresponding to the target item, a current geographic position of the terminal, and a hardware support capability of the terminal;
   feedback, to the terminal, a transfer channel list according to the transfer channel query instruction, the transfer channel list including a first resource channel supporting resource transfer via a first NFC (Near Field Communication) card and a second resource channel supporting resource transfer via a second NFC card different than the first NFC card;
   send, for display on the terminal, the first resource channel and the second resource channel;
   receive, from the terminal, an order instruction by a user for the target item, the order instruction including a selection of one of the first and second resource channels;
   generate an order for the target item and send the generated order to the terminal, and wherein the terminal reads, after acquiring information about the generated order, the first or second NFC card corresponding to the one of the first and second resource channels as selected;
   receive a resource transfer result from the card management system, after the card management system transfers an exchange resource in a first resource account corresponding to the first or second NFC card read by the terminal to a second resource account corresponding to the item transfer apparatus for temporary storage, the first or second NFC card read by the terminal being not pre-bound to the user or the terminal in the card management system;
   send an item transfer instruction to the item provider device according to the resource transfer result and the generated order, the item provider device being separate from the item transfer apparatus; and
   transfer the exchange resource from the second resource account to a third resource account corresponding to the item provider device, after receiving the item transfer result fed back by the item provider device.

2. The item transfer apparatus according to claim 1, wherein the transfer channel list further includes a third resource channel supporting resource transfer via an infrared technology.

3. An item transfer method, the method comprising:
   sending, by a terminal, a transfer channel query instruction on a target item to an order management system, wherein the transfer channel query instruction includes information on a service type corresponding to the target item, a current geographic position of the terminal, and a hardware support capability of the terminal;
   feeding back, by the order management system, a transfer channel list according to the transfer channel query instruction, the transfer channel list including a first resource channel supporting resource transfer via a first NFC (Near Field Communication) card and a second resource channel supporting resource transfer via a second NFC card different than the first NFC card;
   displaying, on the terminal, the first resource channel and the second resource channel;
   sending, by the terminal, an order instruction of the target item from a user to the order management system, the order instruction including a selection of one of the first and second resource channels;
   after receiving the order instruction, generating, by the order management system, an order of the target item according to the order instruction, and feeding back order information of the order to the terminal, the first or second NFC card corresponding to the one of the first and second resource channels as selected;
   after acquiring the order information, reading, by the terminal, the first or second NFC card corresponding to the one of the first and section resource channels as selected;
   sending, by the terminal, a resource exchange instruction to a card management system according to the order information and the first or second NFC card read by the terminal;
   transferring, by the card management system, according to the resource exchange instruction, an exchange resource in a first resource account corresponding to the first or second NFC card to a second resource account corresponding to the order management system for temporary storage, and sending a resource transfer result to the order management system; and
   sending, by the order management system, an item transfer instruction to an item provider device according to the resource transfer result, the item provider device being separate from the order management system; and, after receiving the item transfer result fed back by the item provider device, transferring the exchange resource from the second resource account to a third resource account corresponding to the item provider device according to the item transfer result,
   wherein the first or second NFC card is not pre-bound to the user or the terminal in the card management system.

4. The method according to claim 3, wherein, after the sending, by the order management system, the item transfer instruction to the item provider device according to the resource transfer result, the method further comprises:
   detecting, by the order management system, whether the item transfer result is received from the item provider device within a predetermined time period; and resending, by the order management system, the item transfer instruction to the item provider device if the item transfer result is not received by the order management system within the predetermined time period.

5. The method according to claim 3, wherein the method further comprises:
when checking that transfer of the exchange resource has been completed but the resource transfer result has not been received for the order, reissuing the item transfer instruction to the item provider device with respect to the order.

6. The method according to claim 3, wherein the sending, by the terminal, the order instruction of the target item to the order management system comprises:
when the terminal and the order management system are connected through a convergence management system, sending, by the terminal the order instruction to the convergence management system; and
forwarding, by the convergence management system, the order instruction to the order management system.

7. The method according to claim 3, wherein the sending, by the order management system, the item transfer instruction to the item provider device according to the resource transfer result comprises:
when the order management system and the item provider device are connected through a convergence management system, sending, by the order management system, the item transfer instruction to the convergence management system according to the resource transfer result; and
forwarding, by the convergence management system, the item transfer instruction to the item provider device.

8. The method according to claim 7, wherein the forwarding, by the convergence management system, the item transfer instruction to the item provider device comprises:
checking, by the convergence management system, whether an order corresponding to the item transfer instruction is an order of the target item generated by the order management system; and
when checking that the order corresponding to the item transfer instruction is the order of the target item generated by the order management system, forwarding, by the convergence management system, the item transfer instruction to the item provider device.

9. The item transfer method according to claim 3, wherein the transfer channel list further includes a third resource channel supporting resource transfer via an infrared technology.

10. An item transfer method, the method comprising:
sending, by a terminal, a transfer channel query instruction on a target item to an order management system, wherein the transfer channel query instruction includes information on a service type corresponding to the target item, a current geographic position of the terminal, and a hardware support capability of the terminal;
feeding back, by the order management system, a transfer channel list according to the transfer channel query instruction, the transfer channel list including a first resource channel supporting resource transfer via a first NFC (Near Field Communication) card and a second resource channel supporting resource transfer via a second NFC card different than the first NFC card;
displaying, on the terminal, the first resource channel and the second resource channel;
sending, by the terminal, an order instruction of the target item from a user to the order management system, the order instruction including a selection of one of the first and second resource channels, so that the order management system, after receiving the order instruction, generates an order of the target item, and feeds back order information of the order to the terminal, the first or second NFC card corresponding to the one of the first and second resource channels as selected;
after the order information is acquired from the order management system, reading, by the terminal, the first or second NFC card corresponding to the one of the first and second resource channels as selected; and
sending, by the terminal, a resource exchange instruction to a card management system according to the order information and the first or second NFC card read by the terminal, so that the card management system, according to the resource exchange instruction, transfers an exchange resource in a first resource account corresponding to the first or second NFC card to a second resource account corresponding to the order management system for temporary storage, and sends a resource transfer result to the order management system; the order management system sends an item transfer instruction to an item provider device according to the resource transfer result, the item provider device being separate from the order management system; and, after receiving the item transfer result fed back by the item provider device, the order management system transfers the exchange resource from the second resource account to a third resource account corresponding to the item provider device according to the item transfer result,
wherein the first or second NFC card read by the terminal is not pre-bound to the user or the terminal in the card management system.

11. The item transfer method according to claim 10, wherein the transfer channel list further includes a third resource channel supporting resource transfer via an infrared technology.

* * * * *